(12) United States Patent
Watanabe

(10) Patent No.: US 10,713,260 B2
(45) Date of Patent: Jul. 14, 2020

(54) APPARATUS, METHOD, AND COMPUTER-READABLE RECORDING MEDIUM FOR PROVIDING INFORMATION BASED ON INFORMATION ELEMENTS IDENTIFIED BY USING USER HISTORY INFORMATION AND ESTIMATED VIEWING DURATION INFORMATION

(71) Applicant: Rakuten, Inc., Tokyo (JP)

(72) Inventor: Yasuharu Watanabe, Tokyo (JP)

(73) Assignee: Rakuten, Inc., Tokyo (JP)

( * ) Notice: Subject to any disclaimer, the term of this patent is extended or adjusted under 35 U.S.C. 154(b) by 201 days.

(21) Appl. No.: 15/563,197

(22) PCT Filed: Mar. 31, 2015

(86) PCT No.: PCT/JP2015/060178
§ 371 (c)(1),
(2) Date: Sep. 29, 2017

(87) PCT Pub. No.: WO2016/157426
PCT Pub. Date: Oct. 6, 2016

(65) Prior Publication Data
US 2018/0089279 A1      Mar. 29, 2018

(51) Int. Cl.
*G06F 16/00* (2019.01)
*G06F 16/2457* (2019.01)
*G06F 16/248* (2019.01)
*G06Q 30/02* (2012.01)

(52) U.S. Cl.
CPC ........ *G06F 16/2457* (2019.01); *G06F 16/248* (2019.01); *G06Q 30/0249* (2013.01); *G06Q 30/0256* (2013.01)

(58) Field of Classification Search
None
See application file for complete search history.

(56) References Cited

U.S. PATENT DOCUMENTS

2014/0120961 A1 *  5/2014  Buck ................. H04W 4/12
                                              455/466
2015/0370758 A1 * 12/2015  Bank .................. G06Q 10/109
                                              715/229

FOREIGN PATENT DOCUMENTS

JP      2005-056120 A      3/2005

* cited by examiner

*Primary Examiner* — Son T Hoang
(74) *Attorney, Agent, or Firm* — Sughrue Mion, PLLC

(57) ABSTRACT

An information processing device identifies a search query of a target user to whom an electronic coupon is to be issued and the corresponding search time, and adds the elapsed time between the search time and the current time to an expected interval between the current time and viewing by the target user, to calculate an expected viewing duration. The information processing device then identifies, as estimated viewed items, items associated with an estimated viewing duration of less than or equal to or of less than the calculated expected viewing duration, among items included in estimated viewing duration information corresponding to the identified search query. Based on items included in the target user's history information and on the identified estimated viewed items, the information processing device generates an electronic coupon to be provided to the target user.

8 Claims, 11 Drawing Sheets

FIG. 6A

| | store item code | common item code | store code | price |
|---|---|---|---|---|
| issue target item → | Item 111 | C-123 | S-303 | 10,000 |
| comparison target item → | Item 202 | C-123 | S-011 | 10,000 |
| comparison target item → | Item 002 | C-123 | S-033 | 9,000 |
| comparison target item → | Item 022 | C-123 | S-062 | 11,000 |

FIG. 6B

| | store item code | common item code | store code | price |
|---|---|---|---|---|
| issue target item → | Item 111 | C-123 | S-303 | 10,000 |
| comparison target item → | Item 202 | C-123 | S-011 | 10,000 |
| comparison target item → | Item 002 | C-123 | S-033 | 9,000 |
| comparison target item → | Item 022 | C-123 | S-062 | 11,000 |
| comparison target item → | Item 102 | N-510 | S-098 | 10,000 |
| comparison target item → | Item 950 | RW-77 | S-075 | 11,000 |
| comparison target item → | Item 242 | S1100 | S-075 | 8,000 |
| comparison target item → | Item 062 | N-660 | S-033 | 8,500 |
| comparison target item → | Item 012 | K1220Z | S-061 | 9,500 |
| comparison target item → | Item 088 | S1300 | S-075 | 10,000 |
| comparison target item → | Item 888 | RW-35 | S-075 | 7,000 |

FIG. 7A

| | store item code | common item code | store code | price | log flag |
|---|---|---|---|---|---|
| issue target item → | Item 111 | C-123 | S-303 | 10,000 | - |
| comparison target item → | Item 202 | C-123 | S-011 | 10,000 | 1 |
| comparison target item → | Item 002 | C-123 | S-033 | 9,000 | 1 |
| comparison target item → | Item 022 | C-123 | S-062 | 11,000 | 0 |
| comparison target item → | Item 102 | N-510 | S-098 | 10,000 | 1 |
| comparison target item → | Item 950 | RW-77 | S-075 | 11,000 | 0 |
| comparison target item → | Item 242 | S1100 | S-075 | 8,000 | 0 |
| comparison target item → | Item 062 | N-660 | S-033 | 8,500 | 1 |
| comparison target item → | Item 012 | K1220Z | S-061 | 9,500 | 1 |
| comparison target item → | Item 088 | S1300 | S-075 | 10,000 | 0 |
| comparison target item → | Item 888 | RW-35 | S-075 | 7,000 | 0 |

FIG. 7B

| | store item code | common item code | store code | price | log flag | estimated log flag |
|---|---|---|---|---|---|---|
| issue target item → | Item 111 | C-123 | S-303 | 10,000 | - | 1 |
| comparison target item → | Item 202 | C-123 | S-011 | 10,000 | 1 | 1 |
| comparison target item → | Item 002 | C-123 | S-033 | 9,000 | 1 | 1 |
| comparison target item → | Item 022 | C-123 | S-062 | 11,000 | 0 | 1 |
| comparison target item → | Item 102 | N-510 | S-098 | 10,000 | 1 | 0 |
| comparison target item → | Item 950 | RW-77 | S-075 | 11,000 | 0 | 1 |
| comparison target item → | Item 242 | S1100 | S-075 | 8,000 | 0 | 1 |
| comparison target item → | Item 062 | N-660 | S-033 | 8,500 | 1 | 1 |
| comparison target item → | Item 012 | K1220Z | S-061 | 9,500 | 1 | 0 |
| comparison target item → | Item 088 | S1300 | S-075 | 10,000 | 0 | 0 |
| comparison target item → | Item 888 | RW-35 | S-075 | 7,000 | 0 | 0 |

FIG. 9

|  | store item code | price | lowest price | difference | coupon amount |
|---|---|---|---|---|---|
| (Example 1) | Item 111 | 10,000 | 9,000 | -1,000 | 1,000 |
| (Example 2) | Item 111 | 10,000 | 7,000 | -3,000 | 3,000 |
| (Example 3) | Item 111 | 10,000 | 8,500 | -1,500 | 1,500 |
| (Example 4) | Item 111 | 10,000 | 8,000 | -2,000 | 2,000 |
| (Example 5) | Item 111 | 10,000 | comparison 9,000 | -1,000 | 1,000 |

FIG. 11A

| | store item code | common item code | store code | price |
|---|---|---|---|---|
| issue target item→ | Item 111 | C-123 | S-303 | 10,000 |
| issue target item→ | Item 222 | S1100 | S-102 | 9,000 |
| issue target item→ | Item 333 | RW-77 | S-541 | 11,000 |

FIG. 11B

| | store item code | common item code | store code | price | userID | | | | | |
|---|---|---|---|---|---|---|---|---|---|---|
| | | | | | U-01 | U-02 | U-03 | U-04 | U-05 | U-06 |
| comparison target item— | Item 202 | C-123 | S-011 | 10,000 | 1 | 0 | 0 | 0 | 0 | 1 |
| comparison target item— | Item 002 | C-123 | S-033 | 9,000 | 0 | 1 | 1 | 1 | 1 | 0 |
| comparison target item— | Item 022 | C-123 | S-062 | 11,000 | 0 | 0 | 0 | 0 | 0 | 1 |
| comparison target item— | Item 102 | N-510 | S-098 | 10,000 | 1 | 0 | 0 | 1 | 0 | 1 |
| comparison target item— | Item 950 | RW-77 | S-075 | 11,000 | 0 | 0 | 0 | 1 | 1 | 1 |
| comparison target item— | Item 242 | S1100 | S-075 | 8,000 | 0 | 1 | 0 | 1 | 0 | 0 |
| comparison target item— | Item 062 | N-660 | S-033 | 8,500 | 0 | 0 | 0 | 0 | 0 | 0 |
| comparison target item— | Item 012 | K1220Z | S-061 | 9,500 | 1 | 0 | 0 | 0 | 0 | 1 |
| comparison target item— | Item 088 | S1300 | S-075 | 10,000 | 0 | 0 | 0 | 0 | 0 | 1 |
| comparison target item— | Item 888 | RW-35 | S-075 | 7,000 | 0 | 0 | 1 | 0 | 0 | 0 |

APPARATUS, METHOD, AND COMPUTER-READABLE RECORDING MEDIUM FOR PROVIDING INFORMATION BASED ON INFORMATION ELEMENTS IDENTIFIED BY USING USER HISTORY INFORMATION AND ESTIMATED VIEWING DURATION INFORMATION

TECHNICAL FIELD

The present invention relates to techniques, including systems, for providing information, based on a user's history information.

BACKGROUND ART

There is a conventional service that provides, based on a viewing history of viewing by a user, information to the user. In Patent Literature 1, a system is known. As described in Patent Literature 1, some techniques including collaborative filtering and data mining enable such a system to provide item information depending on a user's interest and taste using history information such as long-term logs relating to the user's consumption behavior.

CITATION LIST

Patent Literature

Patent Literature 1: JP 2005-056120 A

SUMMARY OF INVENTION

Technical Problem

Now, for example, after information is provided to a user by email or the like, the user may view other information before actually seeing the provided information. This is because there is a time lag between when information to be provided based on the user's history information is generated and when the user views the provided information. In this case, a viewing log about the above other information is not reflected in the information provided by email or the like. Thus, information provided to the user based on the user's viewing history is not useful (e.g., not so appealing) to the user, which may cause unnecessary traffic.

Therefore, in view of the above, it is an object of the present invention to provide an information processing device, an information processing method, and an information processing program that are capable of providing information useful to a user and reducing unnecessary traffic, even if there is a time lag between when information to be provided based on the user's history information is generated and when the user views the provided information.

Solution to Problem

To solve the above problem, the invention according to claim 1 includes target user identifying means, search query identifying means, expected viewing duration calculation means, information element identifying means, and generating means. The target user identifying means identifies a user to whom information is to be provided. The search query identifying means identifies a search query of the user identified by the target user identifying means and a search time associated with the search query, from history information of the user identified by the target user identifying means. The expected viewing duration calculation means adds the elapsed time between the search time identified by the search query identifying means and the current time to an expected interval between the current time and viewing by the user identified by the target user identifying means, to calculate an expected viewing duration. Estimated viewing information indicates an estimated viewing duration for each of the information elements identified based on history information of each of a plurality of users including the user identified by the target user identifying means and corresponds to the search query identified by the search query identifying means. The information element identifying means identifies, among information elements included in the estimated viewing information, information elements associated with the estimated viewing duration of less than or equal to or of less than the expected viewing duration calculated by the expected viewing duration calculation means. Based on information elements included in the history information of the user identified by the target user identifying means and on the information elements identified by the information element identifying means, the generating means generates information to be provided to the user identified by the target user identifying means.

This invention enables provision of information useful to a user and reduction of unnecessary traffic, even if there is a time lag between when information to be provided based on the user's history information is generated and when the user views the provided information.

The invention according to claim 2 is the information processing device according to claim 1 further including time identifying means and first estimated viewing duration calculation means. The time identifying means identifies, for each of a plurality of users, a search time for each of the information elements and a viewing time at or after the search time, from history information of the user. The first estimated viewing duration calculation means calculates an estimated viewing duration for each of the information elements as all of the plurality of users, based on the search time for each of the information elements and each of the users and on the viewing time for each of the information elements and each of the users, which are identified by the time identifying means.

This invention enables provision of estimated viewing durations in which the plurality of users' viewing actions are reflected.

The invention according to claim 3 is the information processing device according to claim 2 in which the first estimated viewing duration calculation means calculates, for each of the information elements and each of the users, the elapsed time between the search time identified by the time identifying means and the viewing time, and calculates an estimated viewing duration for each of the information elements as all of the plurality of users, based on the calculated elapsed times. The information processing device further includes setting means. The setting means determines an average viewing duration for the information elements, based on the history information of each of the plurality of users, and sets the determined viewing duration as an upper limit for elapsed times to be calculated by the first estimated viewing duration calculation means.

According to this invention, an upper limit for elapsed times is set. Consequently, more appropriate estimated viewing durations can be provided.

The invention according to claim 4 is the information processing device according to any one of claims 1 to 3 further including classifying means and second estimated viewing duration calculation means. The classifying means classifies a plurality of users into a plurality of segments, based on predetermined classification criteria. The second estimated viewing duration calculation means calculates, for each of a plurality of segments, an estimated viewing duration for each of the information elements, based on history information of each of a plurality of users who belong to the segment.

This invention enables provision of estimated viewing durations suitable for each of the classified segments.

The invention according to claim 5 is the information processing device according to any one of claims 1 to 4 further including expected interval identifying means. The expected interval identifying means identifies, as an expected interval before the viewing, the interval between sending information to a user to whom the information is to be provided and receiving a predetermine reply from the user's terminal.

With this invention, an expected interval based on how each user tends to react can be identified. Consequently, an expected viewing duration can be more correctly calculated.

The invention according to claim 6 is the information processing device according to any one of claims 1 to 4 further including expected interval identifying means. The expected interval identifying means identifies a time from hours during which the user identified by the target user identifying means relatively often accesses the information elements, based on the history information of the user identified by the target user identifying means, and identifies, as an expected interval before the viewing, the interval between the current time and the identified time.

With this invention, an expected interval based on how each user tends to react can be identified. Consequently, an expected viewing duration can be more correctly calculated.

The invention according to claim 7 is an information processing method performed by a computer. The method includes the following steps. A user to whom information is to be provided is identified. A search query of the identified user and a search time associated with the search query are identified from history information of the identified user. The elapsed time between the identified search time and the current time is added to an expected interval between the current time and viewing by the identified user, to calculate an expected viewing duration. Estimated viewing information indicates an estimated viewing duration for each of the information elements identified based on history information of each of a plurality of users including the identified user and corresponds to the identified search query. Among information elements included in the estimated viewing information, information elements associated with the estimated viewing duration of less than or equal to or of less than the calculated expected viewing duration are identified. Based on information elements included in the history information of the identified user and on the identified information elements, information to be provided to the identified user is generated.

The invention according to claim 8 causes a computer to function as target user identifying means, search query identifying means, expected viewing duration calculation means, information element identifying means, and generating means. The target user identifying means identifies a user to whom information is to be provided. The search query identifying means identifies a search query of the user identified by the target user identifying means and a search time associated with the search query, from history information of the user identified by the target user identifying means. The expected viewing duration calculation means adds the elapsed time between the search time identified by the search query identifying means and the current time to an expected interval between the current time and viewing by the user identified by the target user identifying means, to calculate an expected viewing duration. Estimated viewing information indicates an estimated viewing duration for each of the information elements identified based on history information of each of a plurality of users including the user identified by the target user identifying means and corresponds to the search query identified by the search query identifying means. The information element identifying means identifies, among information elements included in the estimated viewing information, information elements associated with the estimated viewing duration of less than or equal to or of less than the expected viewing duration calculated by the expected viewing duration calculation means. Based on information elements included in the history information of the user identified by the target user identifying means and on the information elements identified by the information element identifying means, the generating means generates information to be provided to the user identified by the target user identifying means.

Advantageous Effects of Invention

The present invention enables provision of information useful to a user and reduction of unnecessary traffic, even if there is a time lag between when information to be provided based on the user's history information is generated and when the user views the provided information.

BRIEF DESCRIPTION OF DRAWINGS

FIGS. 6A and 6B are each a diagram showing a list of an issue target item's store item code, common item code, store code, and price and comparison target items' store item codes, common item codes, store codes, and prices.

FIG. 7A is a diagram showing a list of an issue target item's store item code, common item code, store code, and price and comparison target items' store item codes, common item codes, store codes, prices, and log flags.

FIG. 7B is a diagram showing a list of an issue target item's store item code, common item code, store code, and price and comparison target items' store item codes, common item codes, store codes, prices, log flags, and estimated log flags.

FIG. 9 is a diagram showing examples of a coupon amount corresponding to a privilege relative to the difference in price from the cheapest comparison target item.

FIG. 11A is a diagram showing a list of issue target items' store item codes, common item codes, store codes, and prices.

FIG. 11B is a diagram showing comparison target items' store item codes, common item codes, store codes, prices, and user IDs of target users identified for each comparison target item.

DESCRIPTION OF EMBODIMENTS

The following describes an embodiment of the present invention with reference to the drawings. In the embodiment described below, the present invention is applied to an information providing system.

1. Configuration and Functional Overview of Information Providing System

Figure 1:
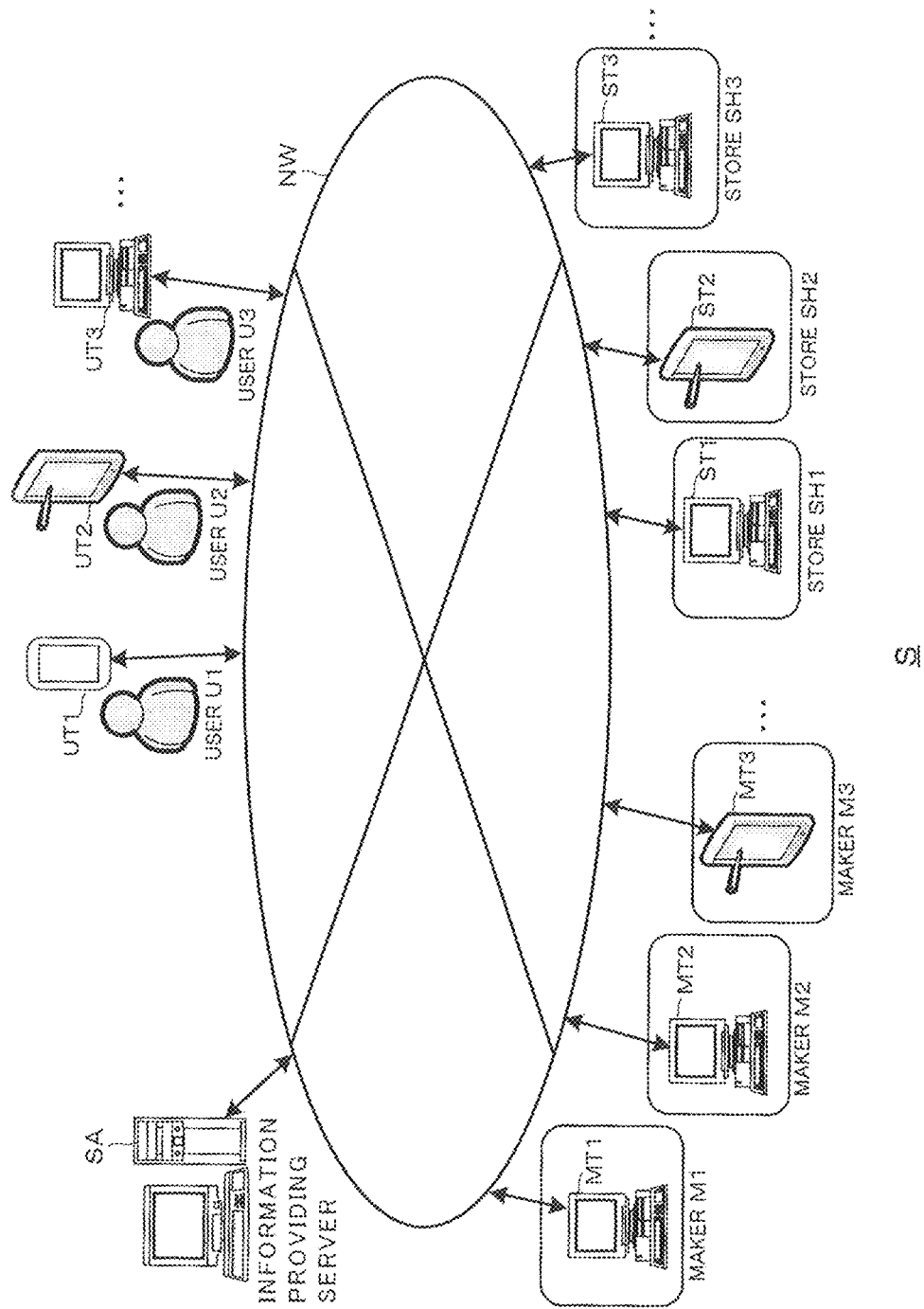
FIG. 1 is a diagram schematically showing an example configuration of an information providing system S according to this embodiment.

A configuration and a functional overview of an information providing system S according to this embodiment is first described with reference to FIG. 1 and other figures. FIG. 1 is a diagram schematically showing an example configuration of the information providing system S according to this embodiment. As shown in FIG. 1, the information providing system S includes, for example, a plurality of maker terminals MTl (l=1, 2, 3 . . . ), a plurality of store terminals STm (m=1, 2, 3 . . . ), a plurality of user terminals UTn (n=1, 2, 3 . . . ), and an information providing server SA. The maker terminals MTl, the store terminals STm, the user terminals UTn, and the information providing server SA are each connected to a network NW. The network NW includes, for example, the Internet, a dedicated communication line (e.g., community antenna television (CATV) line), a mobile communication network (including base stations), and a gateway.

Each maker terminal MTl is a terminal device used by a maker Ml (l=1, 2, 3 . . . ) that manufactures items. Each store terminal STm is a terminal device used by a store SHm (m=1, 2, 3 . . . ) that sells items. The makers and the stores are each an example of a providing entity that provides items. Each user terminal UTn is a terminal device used by a user Un (n=1, 2, 3 . . . ) who wishes to purchase items. The maker terminals MTl, the store terminals STm, and the user terminals UTn each include, for example, an input/display unit, a communication unit, a storage unit, and a controller. The input/display unit includes a touch screen having an input function and a display function. The input function receives operations (user operations) performed with someone's finger, a pen, or the like. The display function displays information on a display screen. The communication unit is responsible for connecting to the network NW and for controlling the state of communications. The storage unit stores an operating system (OS), application programs, a web browser program, and other programs. The controller includes, for example, a central processing unit (CPU), a read only memory (ROM), and a random access memory (RAM). The controller executes the application programs, the web browser program, and other programs on the OS. For example, a personal computer (PC), a mobile phone, a personal digital assistant (PDA), a mobile terminal (smartphone) that is a mobile phone integrated with a personal digital assistant, or a mobile gaming device can be used as a maker terminal MTl, a store terminal STm, and a terminal UTn. Each of the maker terminals MTl, the store terminals STm, and the user terminals UTn is capable of accessing and communicating with the information providing server SA via its communication unit and the network NW. Each of the maker terminals MTl, the store terminals STm, and the user terminals UTn displays, in a window of its web browser, for example, a web page that is sent from the information providing server SA in response to a request to the information providing server SA.

Figure 2B:
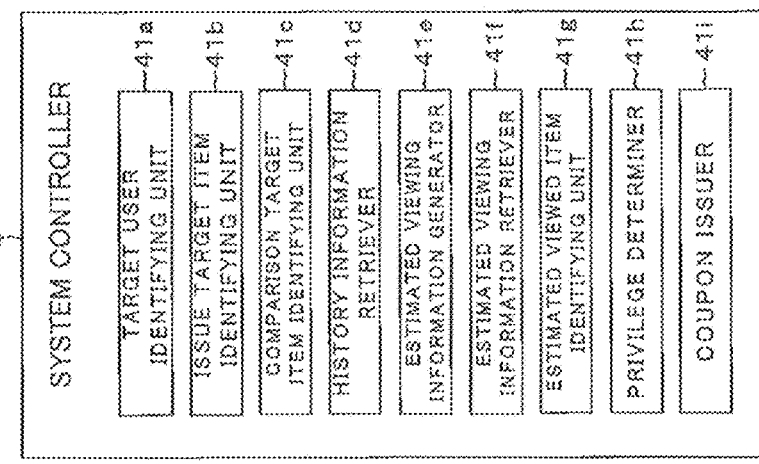
FIG. 2B is a diagram showing example functional blocks in a system controller 4.
Figure 2A:
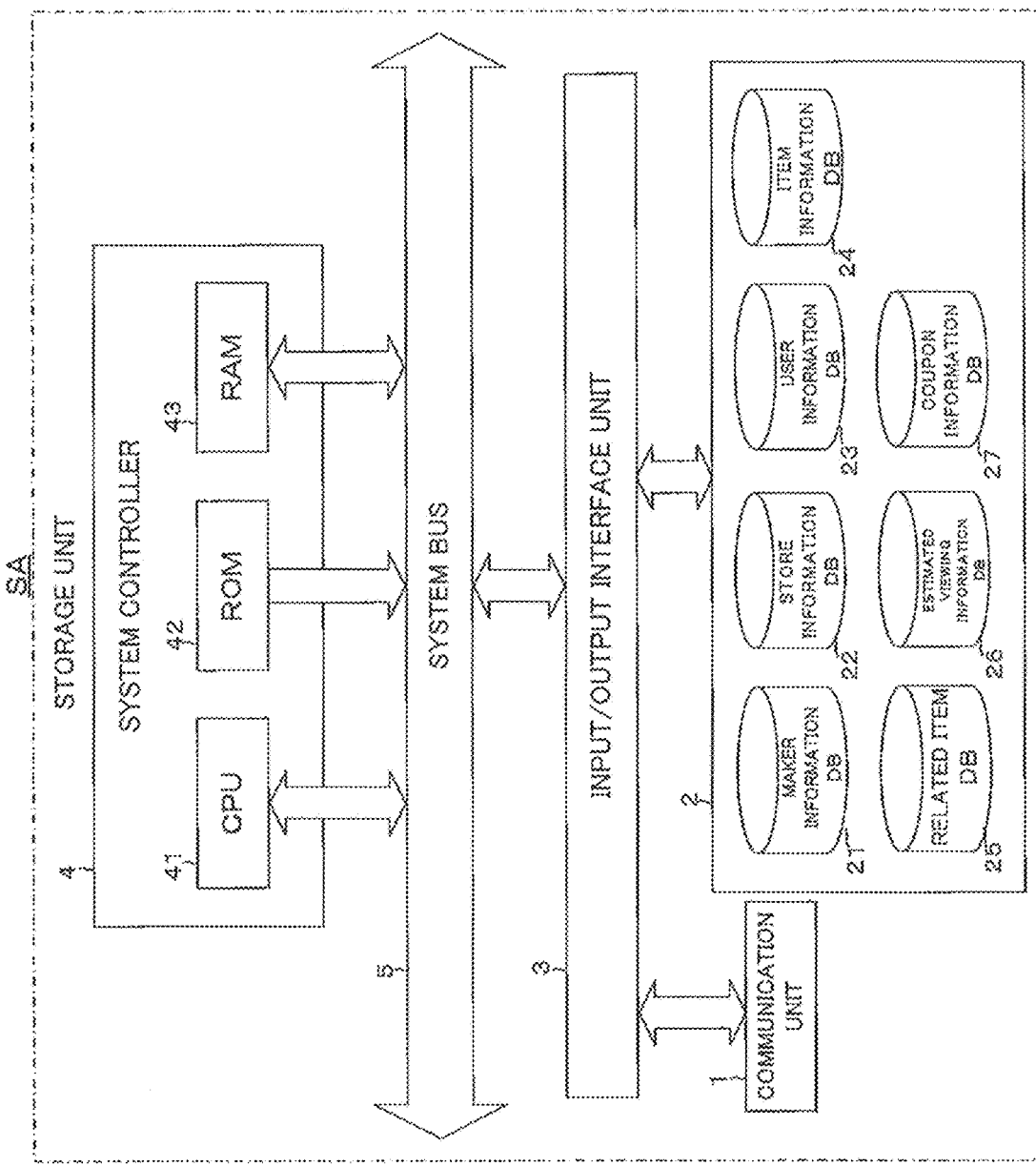
FIG. 2A is a block diagram schematically showing an example configuration of an information providing server SA according to this embodiment.

The information providing server SA is an example of an information processing device according to the present invention. The information providing server SA is a server that provides websites, such as a shopping site and an auction site. FIG. 2A is a block diagram schematically showing an example configuration of the information providing server SA according to this embodiment. As shown in FIG. 2A, the information providing server SA includes, for example, a communication unit 1, a storage unit 2, an input/output interface unit 3, and a system controller 4. The system controller 4 and the input/output interface unit 3 are connected via a system bus 5. The input/output interface unit 3 performs interface processing between the communication unit 1 and the storage unit 2, and the system controller 4. The communication unit 1 is responsible for connecting to the network NW and for controlling the state of communications. The storage unit 2 includes, for example, hard disk drives. The storage unit 2 stores, for example, an operating system (OS) and server programs (including an information processing program according to the present invention). The server programs are downloaded from a predetermined server to the information providing server SA. Alternatively, the server programs may be stored in a (computer-readable) recording medium, such as a CD or a DVD, and be read from the recording medium into the storage unit 2. The storage unit 2 also stores, for example, electronic data that constitutes web pages. The storage unit 2 further has a maker information database (DB) 21, a store information database (DB) 22, a user information database (DB) 23, an item information database (DB) 24, a related item database (DB) 25, an estimated viewing information database (DB) 26, a coupon information database (DB) 27, and other databases, which were created therein.

The maker information database 21 is a database that manages information about makers Ml that became members to use the information providing system S. For example, the maker information database 21 stores, for each maker Ml, the maker Ml's maker ID, password, maker code, and maker item information in association with each other. Each maker ID is identification information unique to the corresponding maker Ml. The maker ID and the password are authentication information required for the maker Ml to log in to the system. Each maker code is a code unique to the corresponding maker Ml and used for others, such as the stores SHm and a site operator, to distinguish makers Ml. The maker item information includes, for example, the common item code of an item manufactured by the maker Ml, the stock quantity of the item, an advertising budget for the item, a sales target for the item, and the actual sales (sales amount) of the item. Each common item code is a code unique to the corresponding item (e.g., the model of the item or an item number unique to the model) and common to a plurality of stores SHm (a code used across the stores) (e.g., the same common item code is assigned to items with the same item specifications and the same maker price (regular price). The maker item information is stored, for example, in response to a registration request from the maker terminal MTl that has accessed the information providing server SA. The stock quantity of the item and the actual sales of the item that are included in the maker item information are updated, for example, every time the transaction of the item is closed (i.e., the sales of the item is completed) or at predetermined intervals. When one maker Ml manufactures multiple types of items with different item specifications, maker item information about the multiple types of items is stored in the maker information database 21.

The store information database 22 is a database that manages information about stores SHm that became members to use the information providing system S. For example, the store information database 22 stores, for each store SHm, the store SHm's store ID, password, store code, and store item information in association with each other. Each store ID is identification information unique to the corresponding store SHm. The store ID and the password are authentication information required for the store SHm to log in to the system. Each store code is a code unique to the corresponding store SHm and used for others, such as the makers Ml and the site operator, to distinguish stores SHm. The store item information includes, for example, the store item code of an item to be sold by the store SHm, the common item code of the item, the stock quantity of the item, an advertising budget for the item, a sales target for the item, and the actual sales (sales amount) of the item. Each store item code is, for example, item identification information assigned to items with the same specifications (of the same model) by the corresponding store SHm and is a unique code in the system S. Items that have the same specifications but are sold by different stores SHm are assigned different store item codes. For example, even single-lens reflex cameras (model: C-123) that were manufactured by a maker Ml and have the same specifications are assigned different store item codes if the items are sold by different stores SHm. The items are also separately and variously priced by the stores SHm. The store item information is stored, for example, in response to a registration request from the store terminal STm that has accessed the information providing server SA. The stock quantity of the item and the actual sales of the item that are included in the store item information are updated, for example, every time the transaction of the item is closed (i.e., the sales of the item is completed) or at predetermined intervals. When one store SHm sells (provides) multiple types of items with different item specifications, store item information about the multiple types of items is stored in the store information database 22.

The user information database 23 is a database that manages information about users Un who became members to use the information providing system S. For example, the user information database 23 stores, for each user Un who became a member, the user Un's user ID, password, user rank, gender, age, item categories of interest, email address, search history, viewing history, bookmark history, and purchase history in association with each other. The search history, the viewing history, the bookmark history, and the purchase history are each an example of history information indicating a history of the user Un's actions (operations). Each user Un's history information may be stored in association with the user ID of the user in a history information database that is provided separately from the user information database 23. Each user ID is identification information unique to the corresponding user Un. The user ID and the password are authentication information required for the user Un to log in to the system. The user rank indicates a rank of membership. For example, the user rank can increase in the order of Silver member, Gold member, Platinum member, and Diamond member. The higher the rank becomes, the more advantageous privilege the user Un can enjoy. Such a user rank is designed to increase (be rated higher), for example, based on the user Un's actual purchases of items and actual answers to questionnaires. Item categories are used to categorize items, for example, broadly into home appliances, food, fashion, interiors, and books. The home appliances are further categorized, for example, into televisions, audio equipment, personal computers, and cameras. The cameras are further categorized, for example, into single-lens reflex cameras and compact cameras. The item categories in which the user Un is interested, among such item categories, are registered, for example, in response to a registration request from the user terminal UTn that has accessed the information providing server SA. The item categories in which the user Un is interested are identified based on the user Un's search history, viewing history, bookmark history, and purchase history and are updated at appropriate times. The information providing server SA can classify the plurality of users Un into a plurality of user bases (segments) using at least one of the users Un's genders, ages, and item categories of interest as the users Un's classification criteria. Examples of the user bases (segments) include "women in their twenties" "women in their thirties", "men in their twenties" "men in their thirties", "men who love cameras", "men who love audio equipment", "women who love accessories", and "women who love perfumes".

The search history includes, for example, search times, search queries, session IDs, and sets of search results in association with each other. Each search time is, for example, the time at which the information providing server SA received a search query or the time at which the information providing server SA performed a search. A search time may be expressed as a search date and time, as a search month, date, and time, or as a search year, month, date, and time. The same applies to a viewing time, a bookmark time, a purchase time, and an electronic coupon issue time, which will be described later. Each search query includes one or more words (narrowing criteria). One or more words (narrowing criteria) and numerical values, which the information providing server SA obtains as a search query, are entered, for example, in a word entry field on a web page displayed by the web browser of the user terminal UTn or are specified (clicked or tapped) from a list of item categories. Each set of search results includes, for example, the common item codes of items, which were found by a search based on the corresponding search query (i.e., items that satisfy the search query (e.g., "single-lens reflex & camera")), the store item codes of the items, the maker codes of manufacturers that manufacture the items, the store codes of stores that sell the items, and item categories to which the items belong. If no items were found by the search based on the search query, the resulting search results include information (NULL) indicating no hits. The search history includes, for example, records each of which is distinguished from the others by the corresponding search request including a search query from the user terminal UTn. One of the records corresponds to one search. The same search queries may be included in different records (e.g., when the user Un used the same search query to perform searches on different dates). The same search queries are counted together as one search query. Not only the same search queries but also similar or related search queries may be counted together as one search query. For example, the search query "single-lens reflex & camera" ("&" is usually specified as " " (space)), the search query "digital single-lens reflex camera" and the search query "digital camera & reflex" are processed as similar or related search queries. Consequently, these search queries are counted as one search query, even when they are divided into four records. The scope of similar or related search queries is freely determined by the site operator, for example, based on item categories.

The information providing server SA identifies, for example, a search duration for which and a search frequency with which the user Un searched for items, based on his or her search history. The search duration is, for example, the time between the search time included in the first record and the search time included in the last record, among a plurality of records in a session (i.e., a plurality of continuous records including the same session ID). The search frequency is the above number of searches performed within a predetermined period of time (e.g., for the past one week). The information providing server SA identifies, for example, categories to which the user Un attaches importance (hereinafter, referred to as "the user Un's important categories"), based on his or her search history. The user Un's important categories are identified, for example, from words or numerical values included in his or her search queries. For example, if the proportion of numerical values indicating item prices in the user Un's search queries (e.g., the proportion relative to the total number of the user Un's search queries) is relatively high, the user's important category is "item price". Alternatively, for example, if the proportion of words indicating item specifications in the search queries is relatively high, the user's important category is "item specifications". The information providing server SA can classify the plurality of users Un into a plurality of user bases (segments) using the users Un's search durations or important categories as the users Un's classification criteria. This can classify the plurality of users Un by type or by tendency. Examples of the user bases (segments) in this case include "short search duration (e.g., less than one minute)", "normal search duration (e.g., between one minute and ten minutes)", "long search duration (e.g., more than ten minutes)", "price-oriented", and "specifications-oriented".

The viewing history includes, for example, viewing times, viewing durations (lengths), the common item codes of viewed items, the store item codes of the items, the maker codes of manufacturers that manufacture the items, the store codes of stores that sell the items, item categories to which the items belong, viewed area information, session start times, and session end times. Each viewing time is, for example, the time (the display start time or a few seconds after the display start time) at which a web page showing detailed information about the corresponding item was displayed on a window of the web browser of the user terminal UTn. For example, when the user Un performs a viewing operation to select his or her desired item on a web page showing search results (i.e., an item list) retrieved based on a search query of the user Un, a web page showing detailed information about the item is obtained from the information providing server SA and displayed on a window of the web browser. Each viewing duration is, for example, the time between the session start time and the session end time in the record of the corresponding viewed item. The viewed area information is sent from the web browser of the user terminal UTn to the information providing server SA at an appropriate time, for example, while the web page is being displayed. The viewed area information may be indicated by coordinates on the web page, or may be indicated by an image or a text. For example, when an image arranged on the web page remains displayed for a predetermined period of time or more, viewed area information indicating the image is included in the viewing history. The viewing history includes, for example, records each of which is distinguished from the others by the corresponding viewing request from the user terminal UTn. One of the records corresponds to one viewing. The information providing server SA can classify the plurality of users Un into a plurality of user bases (segments) using the users Un's viewing durations or viewed area information as the users Un's classification criteria. This can also classify the plurality of users Un by type or by tendency. Examples of the user bases (segments) in this case include "short viewing duration (e.g., less than three minutes)", "normal viewing duration (e.g., between three and fifteen minutes), "long viewing duration (e.g., more than fifteen minutes)", "image-oriented", and "text-oriented".

The bookmark history includes, for example, bookmark times, the common item codes of bookmarked items (e.g., items bookmarked in accordance with the user Un's bookmark operations), the store item codes of the items, the maker codes of manufacturers that manufacture the items, the store codes of stores that sell the items, and item categories to which the items belong. The purchase history includes, for example, purchase times, purchase prices, the common item codes of purchased items, the store item codes of the items, the maker codes of manufacturers that manufacture the items, the store codes of stores that sell the items, and item categories to which the items belong. The purchase history includes, for example, records each of which is distinguished from the others by the corresponding purchase request from the user terminal UTn. One of the records corresponds to one purchase.

The item information database 24 is a database that manages information about items marketed as transaction objects by the stores SHm. For example, the item information database 24 stores, for each of the items marketed as transaction objects by the stores SHm, the common item code of the item, the store item code of the item, the maker code of the manufacturer that manufactures the item, the store code of a store that sells the item, the name of the item, the price of the item, the specifications of the item, an item category to which the item belongs, the stock quantity of the item (the stock quantity of the item in the store SHm that markets the item), and a coupon issue flag in association with each other. The coupon issue flag indicates whether to issue an electronic coupon (an example of information provided to users) for the item. For example, the coupon issue flag is used in an electronic coupon issue process (Push-type) to be described later. The item information database 24 may store, separately for each store SHm or each maker Ml, how many times an item was searched for, how many times the item was viewed, how many times the item was bookmarked, and how many times the item was purchased, in association with a store item code. For example, the related item database 25 stores, for each group including mutually related items, the common item codes of the mutually related items in association with each other. The scope of related items is freely determined by the site operator, for example, based on item categories.

The estimated viewing information database 26 is a database that manages estimated viewing information indicating an estimated viewing duration for each item (an example information element) identified based on the history information of each of the plurality of users Un (hereinafter, referred to as "estimated viewing duration information"). Estimated viewing duration information is generated for each of a plurality of separate search queries and stored in association with each search query. Each search query may be one search query, such as "single-lens reflex & camera". Alternatively, each search query may be a search query group including similar or related search queries as described above. For example, each piece of estimated viewing duration information includes, for each item (each store item code, in this embodiment), the store item code of the item and an estimated viewing duration for the item in association with each other. The estimated viewing duration is, for example, the average value (or standard deviation value) of elapsed times, each of which is the time between a search time and a corresponding viewing time (in other words, the time required between a search and a subsequent viewing) of each of the plurality of users Un. This estimated viewing information database 26 enables even items that are not included in the history information of a user Un to be provided with information (e.g., to whom an electronic coupon is to be issued) to be identified and used as items that the user Un would have viewed.

The coupon information database 27 is a database that manages management information of generated and issued electronic coupons. The coupon information database 27 stores, for each of the generated and issued electronic coupons, management information, such as the coupon ID of the electronic coupon, the common item code of an item for which the electronic coupon was issued, the store item code of the item, the maker code of the manufacturer that manufactures the item, the store code of a store that sells the item, the user ID of a user to whom the electronic coupon was issued, the issue time of the electronic coupon, the privilege (coupon amount) of the electronic coupon, a validity period for the electronic coupon, and whether the electronic coupon was used, in association with each other. Each user ID is identification information unique to the corresponding issued electronic coupon.

The system controller 4 as a computer includes, for example, a CPU 41 (processor), a ROM 42, and a RAM 43. The system controller 4 executes, for example, the server programs on the OS. FIG. 2B is a diagram showing example functional blocks in the system controller 4. As shown in FIG. 2B, the system controller 4 (the processor in the system controller 4) executes the server programs to function as, for example, a target user identifying unit 41a, an issue target item identifying unit 41b, a comparison target item identifying unit 41c, a history information retriever 41d, an estimated viewing information generator 41e, an estimated viewing information retriever 41f, an estimated viewed item identifying unit 41g, a privilege determiner 41h, and a coupon issuer 41i. The target user identifying unit 41a is an example of target user identifying means. The history information retriever 41d is an example of search query identifying means. The estimated viewing information generator 41e is an example of time identifying means, first estimated viewing duration calculation means, setting means, classifying means, and second estimated viewing duration calculation means. The estimated viewed item identifying unit 41g is an example of expected interval identifying means, expected viewing duration calculation means, and information element identifying means. The coupon issuer 41i is an example of generating means.

The target user identifying unit 41a identifies a user Un (e.g., identifies the user ID of the user) to whom an electronic coupon is to be issued (hereinafter, referred to as a "target user"), for example, from among the users Un that were registered (i.e., whose user IDs are stored) in the user information database 23. The target user is an example of an user to whom information is to be provided.

The issue target item identifying unit 41b identifies one or more items (e.g., identifies the common item code(s) and the store item code (s) of the item (s)) for which the electronic coupon is to be issued (hereinafter, referred to as "issue target item (s)"), for example, from among the items that were registered (i.e., whose item IDs are stored) in the item information database 24.

The comparison target item identifying unit 41c identifies one or more items (e.g., identifies the common item code(s) and the store item code (s) of the item (s)) that are to be compared with an issue target item identified by the issue target item identifying unit 41b (hereinafter, referred to as "comparison target item(s)"), for example, from among the items registered in the item information database 24. When a plurality of issue target items are identified, a comparison target item is identified for each issue target item. The comparison target item identifying unit 41c identifies, for example, an item whose common item code is the same as that of the issue target item and whose store item code is different from that of the issue target item as a comparison target item. This item is an item that another store SHm than a store that sells the issue target item sells. The comparison target item identifying unit 41c may identify an item whose common item code is related to that of the issue target item and whose store item code is different from that of the issue target item as a comparison target item. This item is also an item that another store SHm than the store that sells the issue target item sells. An item whose common item code is the same as or related to that of the issue target item can be regarded as a competing item that competes with the issue target item in sales. An item whose common item code is related to that of the issue target item can be identified from the related item database 25.

The comparison target item identifying unit 41c may identify an item whose common item code is the same as or related to that of the issue target item, whose store item code is different from that of the issue target item, and that is identified from the above target user's history information as a comparison target item. The history information retriever 41d retrieves the target user's history information (i.e., the history information associated with the user ID of the target user) from the user information database 23. The history information retriever 41d then identifies which items were searched for, viewed, or bookmarked by the target user, for example, from the search history, the viewing history, or the bookmark history included in the retrieved history information. From among items whose common item code is the same as or related to that of the issue target item, the comparison target item identifying unit 41c identifies an item identified from the history information as a comparison target item. Such an item is likely to be an item that the target user is concerned with (or interested in). Thus, identifying such an item as a comparison target item allows the privilege determiner 41h to determine a more appropriate privilege. From among items whose common item code is the same as or related to that of the issue target item and that are identified from the above target user's history information, the comparison target item identifying unit 41c may identify an item whose number of searches or number of views, which is identified from the history information (i.e., the search history or the viewing history), is greater than or equal to a predetermined number of times (threshold value) as a comparison target item. This is because the target user is more concerned with (or interested in) an item searched for or viewed more frequently. Thus, identifying such an item as a comparison target item can determine a much more appropriate privilege.

The comparison target item identifying unit 41c is more effective when comparing the search time (or the viewing time) for the issue target item with the search time (or the viewing time) for each of the items whose common item code is the same as or related to that of the issue target item, and then identifying an item (i.e., whose common item code is the same as or related to that of the issue target item) whose difference between the times (the search times or the viewing times) is less than (or less than or equal to) a predetermined difference (threshold value: e.g., about thirty minutes) as a comparison target item. It is likely that such an item was searched for or viewed around the same time as the issue target item. Thus, identifying such an item as a comparison target item can determine a much more appropriate privilege. The search time and viewing time for the issue target item and the search time and viewing time for an item whose common item code is the same as or related to that of the issue target item are each identified from the target user's history information retrieved by the history information retriever 41d.

As described above, use of the target user's history information can identify a more appropriate comparison target item. However, it can be difficult to retrieve all the history information of the target user. For example, after a comparison target item is identified based on the target user's history information and, following this as will be described later, an electronic coupon issued by the coupon issuer 41i is provided to the target user, the target user may view another item before actually seeing the provided electronic coupon. This is because there is a time lag between when the electronic coupon is issued (generated) based on the target user's history information and when the target user views the provided electronic coupon. In this case, a history of viewing the above other item is not reflected in the identification of the comparison target item based on the target user's history information. Thus, it will be difficult to identify a more appropriate comparison target even when using the target user's history information. Also for example, when the target user uses different types of user terminals STm (e.g., personal computers (desktops) and mobile terminals), different types of web browser programs, or different websites, it is difficult to combine pieces of history information about those into one piece. Even when the target user uses the same website, it is difficult to retrieve all the history information of the target user if using the website in a non-logged in state. In such a case, it will be difficult to identify a more appropriate comparison target even when using the target user's history information.

For this reason, in this embodiment, by using the estimated viewing duration information stored in the estimated viewing information database 26, items not included in the target user's history information are identified as items that would have been viewed by the target user, and the identified items are added to the target user's viewing history. The estimated viewing duration information is generated by the estimated viewing information generator 41e and stored in the estimated viewing information database 26.

Figure 3:
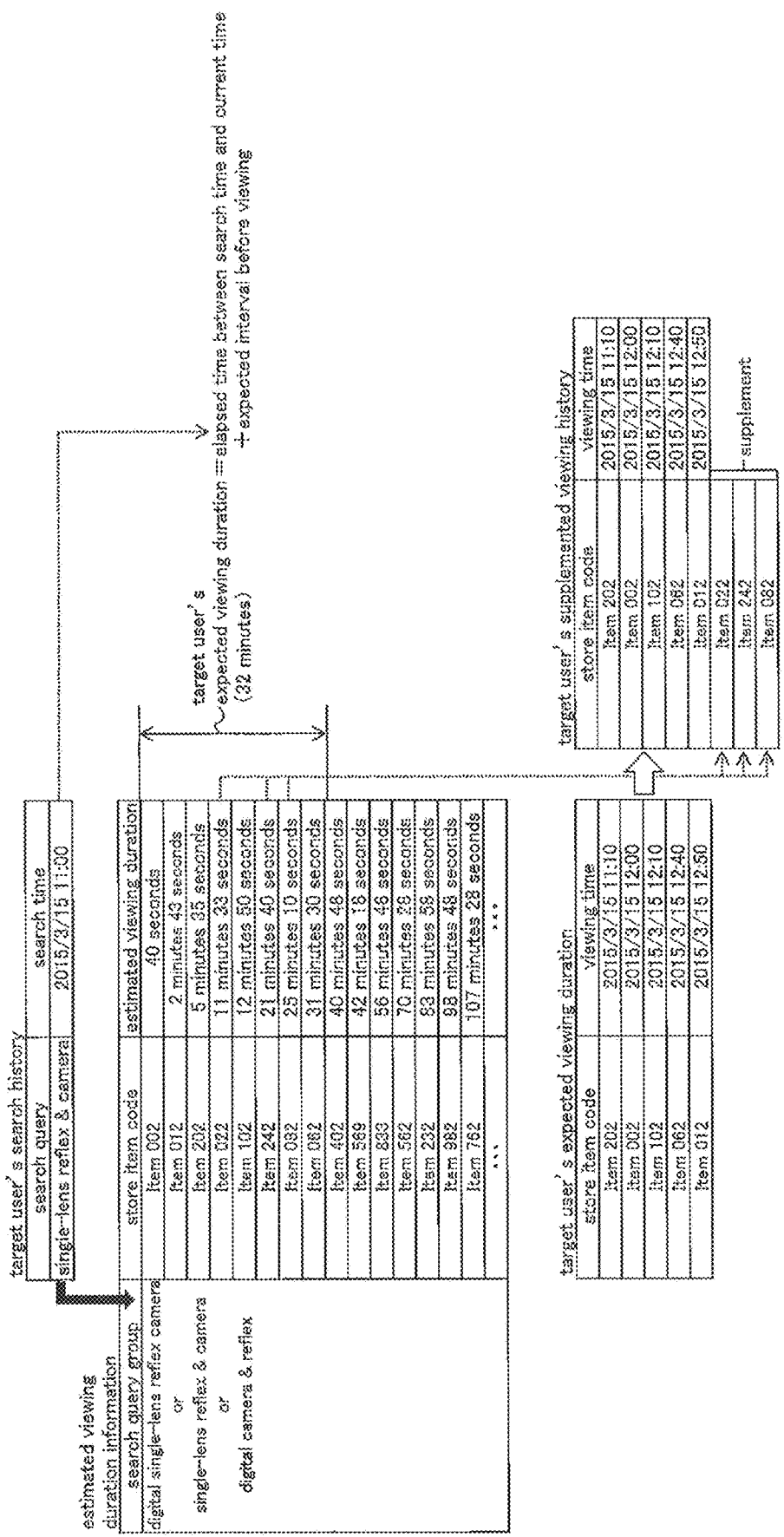
FIG. 3 is a schematic diagram illustrating an example where a target user's viewing history is supplemented by using estimated viewing duration information.

How to add items identified by using the estimated viewing duration information to the target user's viewing history will now be described with reference to FIG. 3. FIG. 3 is a schematic diagram illustrating an example where the target user's viewing history is supplemented by using the estimated viewing duration information. In this case, the estimated viewing information retriever 41f identifies, from the search history included in the target user's history information, a search query of the target user and the search time associated with the search query. Subsequently, the estimated viewing information retriever 41f retrieves the estimated viewing duration information corresponding to the search query identified from the target user's search history, from the estimated viewing information database 26. For example, the estimated viewing information retriever 41f retrieves the estimated viewing duration information associated with a search query identical to the search query identified from the target user's search history. Alternatively, the estimated viewing information retriever 41f retrieves the estimated viewing duration information associated with a search query group including the search query identified from the target user's search history. In the example of FIG. 3, the estimated viewing duration information associated with a search query group including the search query "single-lens reflex & camera" identified from the target user's search history is retrieved.

Subsequently, the estimated viewed item identifying unit 41g adds the elapsed time between the search time identified from the target user's search history and the current time (i.e., the time when this process is performed) to an expected interval between the current time and viewing by the target user, to calculate an expected viewing duration (32 minutes, in the example of FIG. 3). The estimated viewed item identifying unit 41g then identifies items associated with an estimated viewing duration that is less than (or less than or equal to) the above calculated expected viewing duration (i.e., the expected viewing duration > or ≥ the estimated viewing duration), among the items included in the estimated viewing duration information retrieved by the estimated viewing information retriever 41f. Among the items thus identified (the items whose store item codes are Item002 to Item062, in the example of FIG. 3), items (the items whose store item codes are Item022, Item242, and Item082, in the example of FIG. 3) not included in the target user's history information (i.e., viewing history) are referred to as estimated viewed items (supplementary items). The estimated viewed item identifying unit 41g adds the above identified estimated viewed items to the target user's viewing history, to generate a supplemented viewing history as illustrated in FIG. 3.

The comparison target item identifying unit 41c identifies, as a comparison target item, an estimated viewed item whose common item code is the same as or related to that of the issue target item, whose store item code is different from that of the issue target item, and that is identified by the estimated viewed item identifying unit 41g. Thus, even if there is a time lag between when an electronic coupon is issued based on the target user's history information and when the target user views the provided electronic coupon and even if it can be difficult to retrieve all the history information of the target user, a more appropriate comparison target item can be identified and a much more appropriate privilege can be determined.

Subsequently, the privilege determiner 41h determines a privilege (e.g., a predetermined amount reduction in price and a predetermined percentage discount off an item price) relative to the difference in price between the issue target item identified by the issue target item identifying unit 41b and the comparison target item identified by the comparison target item identifying unit 41c. For example, when the price of the issue target item is higher than the price of the comparison target item, the difference calculated by subtracting the price of the comparison target item from the price of the issue target item is determined to be a coupon amount corresponding to the privilege. That is, in this case, the difference in price is equal to the coupon amount. Thus, the issue target item can compete with the comparison target item (e.g., a competing item) on price. Alternatively, the privilege determiner 41h may determine the amount calculated by adding a predetermined amount to the difference to be the coupon amount. In this case, for example, when the difference is \1,000, the coupon amount is determined to be \1,200 (i.e., the coupon amount is increased). Financial resources (in other words, budgets) for the coupon amount are provided, for example, by a store SHm, a maker Ml, the site operator, or an advertiser.

Subsequently, the coupon issuer 41i generates an electronic coupon (coupon data) indicating the coupon amount corresponding to the privilege determined by the privilege determiner 41h. That is, based on the items included in the history information of the target user identified by the target user identifying unit 41a and on the items identified by the estimated viewed item identifying unit 41g, the coupon issuer 41i generates an electronic coupon to be provided to the target user. The coupon issuer 41i then issues the generated electronic coupon to the target user identified by the target user identifying unit 41a. The issue of the electronic coupon includes, for example, assignment of a coupon ID to the generated electronic coupon, registration of management information of the electronic coupon (in the coupon information database 27), and provision of the electronic coupon to the target user. The management information of the electronic coupon includes, for example, the coupon ID, the common item code of the issue target item, the store item code of the issue target item, the maker code of the manufacturer that manufactures the issue target item, the store code of a store that sells the issue target item, the user ID of the target user, the issue time, the privilege (coupon amount), and the validity period.

2. How Information Providing System S Works

The following describes how the information providing system S according to this embodiment works.

2-1. Estimated Viewing Duration Information Generation Process

Figure 4:
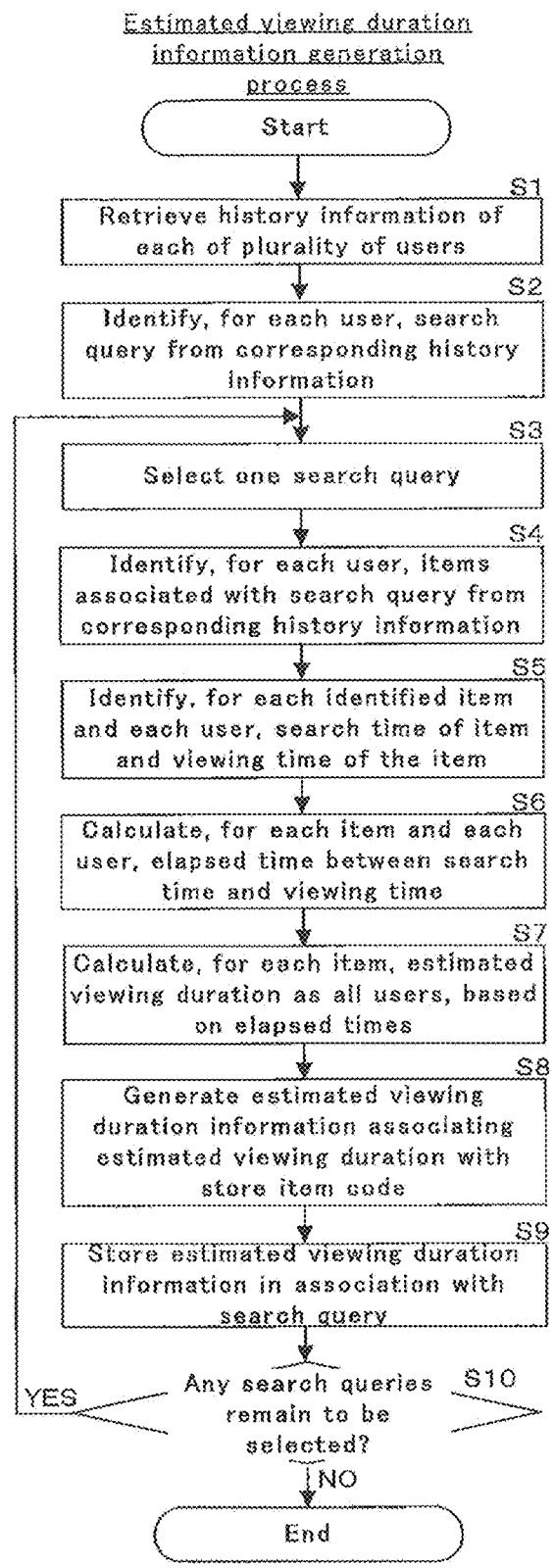
FIG. 4 is a flowchart showing an example of an estimated viewing duration information generation process performed by the system controller 4.

An estimated viewing duration information generation process performed by the system controller 4 (the estimated viewing information generator 41e) of the information providing server SA will now be described with reference to FIG. 4. FIG. 4 is a flowchart showing an example of the estimated viewing duration information generation process performed by the system controller 4. The process shown in FIG. 4 is started at a time set by a timer at predetermined intervals (e.g., every twenty-four hours). When the process shown in FIG. 4 is started, the system controller 4 retrieves the history information of each of a plurality of users Un (e.g., all users Un) from the user information database 23 (Step S1). Subsequently, the system controller 4 identifies, for each user (i.e., user ID), search queries from the corresponding history information retrieved in Step S1 (Step S2).

Next, the system controller 4 selects one search query (or one search query group) from among the search queries identified in Step S2 (Step S3). The system controller 4 then identifies, for each user, items found by the search based on the search query (or one of the search queries included in the search query group) selected in Step S3 (hereinafter, referred to as "items associated with the search query (or the search query group)") from the above corresponding retrieved history information (e.g., by their store item codes) (Step S4).

Subsequently, the system controller 4 identifies, for each of the items (e.g., the store item codes) identified in Step S4 and each user, the search time for the item and the viewing time (viewing time at or after the search time) for the item, from the above corresponding retrieved history information (Step S5). The system controller 4 then calculates (counts), for each item and each user, the elapsed time between the search time and the viewing time that are identified in Step S5 (i.e., the time required between the search and the viewing) (Step S6).

The system controller 4 may determine an average viewing duration for each item (e.g., by averaging a plurality of viewing durations), based on the above retrieved history information, and set the determined viewing duration (e.g., the duration for which detailed information about the item is being viewed through a web browser) as an upper limit (e.g., thirty minutes) for elapsed times to count. For example, assuming that the search time associated with a search query is 11:00, that the viewing time for an item (Item001) associated with the search query is 11:10, that the viewing time for an item (Item002) associated with the search query is 11:20, and that the viewing time for an item (Item003) associated with the search query is 16:10, the elapsed time for the item (Item001) and the elapsed time for the item (Item002) is respectively 10 minutes and 20 minutes. In contrast, the elapsed time for the item (Item003) is five hours. This is unnaturally long as compared with thirty minutes, which is an average viewing duration for an item, and its reliability as elapsed time data is low. Thus, setting an upper limit for elapsed times to count can provide more appropriate estimated viewing durations.

An upper limit for elapsed times to count may be set for each user or each user base (segment) (e.g., average viewing durations vary from user to user or from user base to user base). Also for example, an upper limit for elapsed times to count may be set for each period of hours. For example, the upper limit for elapsed times to count is set to two hours for the hours from 20 to 2 (e.g., hours during which users usually make access) and set to thirty minutes for the other hours. Also for example, an upper limit for elapsed times to count may be set for each type of user terminal (e.g., personal computers (desktops) and mobile terminals). For example, the upper limit for elapsed times to count is set to two hours for personal computers and set to thirty minutes for mobile terminals. In this case, the type of the corresponding user terminal is obtained during the search or the viewing (e.g., from a cookie) and stored in the history information.

An item whose elapsed time calculated in Step S6 is less than (or less than or equal to) a predetermined period of time (threshold value: e.g., ten seconds) may be removed as noise. In this case, the elapsed time corresponding to the item is removed from an operation to calculate estimated viewing durations in the following Step S7.

Subsequently, the system controller 4 calculates, for each item, an estimated viewing duration as all of the plurality of users, based on the elapsed times calculated for each user in Step S6 (Step S7). That is, based on the search time for each item and each user and on the viewing time for the item and the user, the system controller 4 calculates each item's elapsed time as all of the plurality of users to be an estimated viewing duration. This can provide estimated viewing durations in which the plurality of users' viewing actions are reflected. For example, the average value or the standard deviation value of the plurality of user's elapsed times calculated in Step S6 is calculated for each item to be the estimated viewing duration as all of the plurality of users.

Next, the system controller 4 generates estimated viewing duration information associating the estimated viewing duration calculated for each item in Step S7 with the store item code of the item (Step S8). The system controller 4 then stores the estimated viewing duration information generated in Step S8 in association with the search query (or the search query group) selected in the above Step S3 in the estimated viewing information database 26 (Step S9). After that, the system controller 4 determines whether the search queries identified in Step S2 include any search queries yet to be selected in Step S3 (Step S10). If the system controller 4 determines that some search queries remain to be selected (YES in Step S10), the process returns to Step S3. The system controller 4 then performs the same steps as above for another search query. On the other hand, if it determines that no search query remains to be selected (NO in Step S10), the system controller 4 terminates the process shown in FIG. 4.

After the process shown in FIG. 4 is started, the system controller 4 may classify the plurality of users into a plurality of user bases (segments) before Step S1, based on predetermined classification criteria (e.g., the above search durations (short, normal, and long) or important categories (image-oriented and text-oriented)), and retrieve, for each of the user bases, the history information of each of a plurality of users who belong to the user base in Step S1. In this case, the system controller 4 performs, for each of the user bases, Step S2 and subsequent steps, to calculate an estimated viewing duration for each of the user bases and generate estimated viewing duration information. This can generate estimated viewing duration information using estimated viewing durations suitable for each of the user bases. The estimated viewing duration information thus generated is stored in association with the corresponding search query (or search query group) and with the corresponding user base in the estimated viewing information database 26.

2-2. Electronic Coupon Issue Process (Pull-Type)

Figure 5:
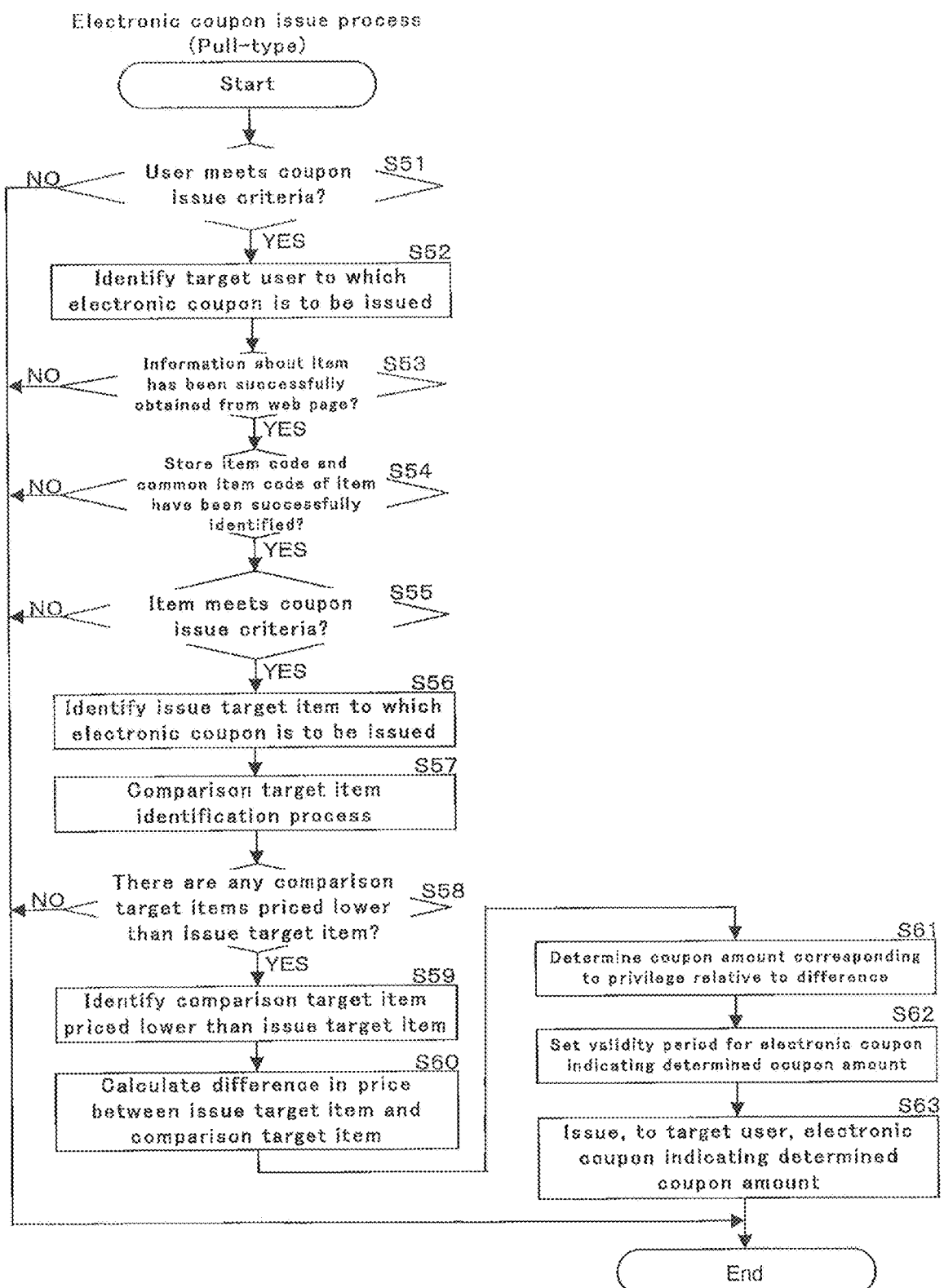
FIG. 5 is a flowchart showing an example of an electronic coupon issue process (Pull-type) performed by the system controller 4.

With reference to FIG. 5, the following describes an electronic coupon issue process (Pull-type) performed by the system controller 4 of the information providing server SA. FIG. 5 is a flowchart showing an example of the electronic coupon issue process (Pull-type) performed by the system controller 4. The process shown in FIG. 5 is started after login of the user U1 of the user terminal UT1 is performed in response to a login request from the user terminal UT1 that has accessed the information providing server SA. The login request may be made by a toolbar of the web browser. The toolbar is, for example, a belt-shaped area that is displayed on the top of a window of the web browser and in which buttons for performing various functions are placed. The information providing server SA identifies the user ID of the user U1 through the login of the user U1.

When the process shown in FIG. 5 is started, the system controller 4 of the information providing server SA determines whether the logged-in user U1 is a user who meets coupon issue criteria (Step S51). This determination is made, for example, by referring to the user rank, the history information, and other information stored in association with the user ID of the user U1 in the user information database 23. Examples of the coupon issue criteria include the following criteria (i) to (vii).

(i) The user rank of the user is a predetermined rank (e.g., Platinum member or higher).
(ii) The number of searches by the user within a predetermined period of time is greater than or equal to a predetermined number of times (threshold value) (e.g., the number of searches within the past week is ten or more).
(iii) The number of search queries by the user within a predetermined period of time is greater than or equal to a predetermined number (threshold value) (e.g., the number of search queries within the past week is twenty or more).
(iv) The number of views by the user within a predetermined period of time is greater than or equal to a predetermined number of times (threshold value) (e.g., the number of views within the past week is twenty or more).
(v) The viewing duration of the user within a predetermined period of time is greater than or equal to a predetermined duration (threshold value) (e.g., the total viewing duration within the past week is thirty minutes or more).
(vi) The purchase price paid by the user within a predetermined period of time is greater than or equal to a predetermined price (threshold value) (e.g., the purchase price within the past week is thirty thousand yen or more).
(vii) The number of purchases by the user within a predetermined period of time is greater than or equal to a predetermined number of times (threshold value) (e.g., the number of purchases within the past week is ten or more).

The number of search queries is the total number of search queries included in the search history associated with the user ID of the user U1. Alternatively, the number of search queries may be the number of search queries on which a search that found one or more items was based, among all the search queries included in the search history associated with the user ID of the user U1. Alternatively, the number of search queries may be obtained by counting the same search queries and similar or related search queries, among all the search queries included in the search history associated with the user ID of the user U1, as one search query.

If the system controller 4 determines that the user meets the coupon issue criteria (e.g., at least one of the above criteria (i) to (vii)) (YES in Step S51), the process proceeds to Step S52. On the other hand, if it determines that the user does not meet the coupon issue criteria (NO in Step S51), the system controller 4 terminates the process shown in FIG. 5.

In Step S52, the system controller 4 (the target user identifying unit 41*a*) identifies the logged-in user U1 as a target user to whom an electronic coupon is to be issued. Subsequently, the system controller 4 determines whether information about an item (e.g., the store item code, the name, and the price of the item) has been successfully obtained from a web page displayed by a web browser of the user terminal UT1 of the target user (the user U1, in this example) identified in Step S52 (Step S53). For example, for a web page (e.g., a web page indicating detailed information about an item) sent from the information providing server SA to the user terminal UT1, the system controller 4 can obtain information about the item (marketed by a store SHm) from the web page. On the other hand, even for a web page (e.g., a web page indicating detailed information about an item) sent from a server (another website) except the information providing server SA to the user terminal UT1, the system controller 4 can sometimes obtain information about the item (e.g., the name and the price of the item) from the web page via a toolbar of the web browser.

If the system controller 4 determines that information about an item has been successfully obtained (YES in Step S53), the process proceeds to Step S54. On the other hand, if it determines that no information about an item has been successfully obtained (NO in Step S53), such as when a web page for a non-item is being displayed, the system controller 4 terminates the process shown in FIG. 5.

In Step S54, the system controller 4 determines, based on the information about the item obtained in Step S53, whether the store item code and the common item code have been successfully identified. For example, when the information about the item has been obtained from the web page sent from the information providing server SA to the user terminal UT1, the store item code and the common item code of the item can be identified, for example, from the item information database 24. On the other hand, when the information about the item has been obtained from the web page sent from a server (another website) except the information providing server SA to the user terminal UT1, for example, if information about a competing item is preset in association with the name of this item (e.g., freely set by a system administrator), the store item code and the common item code of the competing item can be identified from the item information database 24. In this case, the item about which information has been obtained is an item to be a trigger for issue of an electronic coupon, and the competing item is a candidate issue target item.

If the system controller 4 determines that the store item code and the common item code have been successfully identified (YES in Step S54), the process proceeds to Step S55. On the other hand, if it determines that the store item code and the common item code have not been successfully identified (NO in Step S54), the system controller 4 terminates the process shown in FIG. 5.

In Step S55, the system controller 4 determines whether the item whose store item code and common item code have been successfully identified is an item that meets coupon issue criteria. This determination is made, for example, by referring to the stock quantity of the item, an advertising budget for the item, a sales target for the item, and the sales amount of the item that are stored in association with the store item code of the item in the maker information database 21 or the store information database 22. For example, if the stock quantity of the item is greater than or equal to a predetermined number (threshold: e.g., five), if the sales amount of the item is less than (or less than or equal to) the sales target (threshold), or if the stock quantity of the item is greater than or equal to a predetermined number and the sales amount of the item is less than (or less than or equal to) the sales target, it is determined that the item is an item that meets the coupon issue criteria.

If the system controller 4 determines that the item meets the coupon issue criteria (YES in Step S55), the process proceeds to Step S56. On the other hand, if it determines that the item does not meet the coupon issue criteria (NO in Step S55), the system controller 4 terminates the process shown in FIG. 5.

In Step S56, the system controller 4 (the issue target item identifying unit 41b) identifies the item determined to meet the coupon issue criteria in Step S55 as an issue target item for which an electronic coupon is to be issued, and stores information such as the store item code, the common item code, and the price of the identified issue target item in a predetermined area of the RAM. Subsequently, the system controller 4 (the comparison target item identifying unit 41c) performs a comparison target item identification process for identifying comparison target items to be compared with the issue target item identified in Step S56 (Step S57). Examples of the comparison target item identification process include the following (a) to (d).

(a) Comparison Target Item Identification Process (Example 1)

In a comparison target item identification process (Example 1), the system controller 4 identifies items whose common item code is the same as that of the issue target item and whose store item code is different from that of the issue target item as comparison target items from the item information database 24, and stores information such as the store item codes, the common item codes, and the prices of the identified comparison target items in a predetermined area of the RAM. FIG. 6A is a diagram showing a list of the store item code, the common item code, the store code, and the price of the issue target item identified in Step S56 and the store item codes, the common item codes, the store codes, and the prices of the comparison target items identified in the comparison target item identification process (Example 1). As shown in FIG. 6A, the common item code of the issue target item and the common item codes of the comparison target items are the same as each other.

(b) Comparison Target Item Identification Process (Example 2)

In a comparison target item identification process (Example 2), the system controller 4 identifies comparison target items whose common item code is the same as that of the issue target item and whose store item code is different from that of the issue target item as comparison target items as in the comparison target item identification process (a), and stores information such as the store item codes, the common item codes, and the prices of the identified comparison target items in a predetermined area of the RAM. Subsequently, the system controller 4 identifies items whose common item code is related to that of the issue target item and whose store item code is different from that of the issue target item as comparison target items from the item information database 24, and stores information such as the store item codes, the common item codes, and the prices of the identified comparison target items in a predetermined area of the RAM. For example, the system controller 4 retrieves the common item codes of related items, which are related to the issue target item, stored in association with the common item code of the issue target item in the related item database 25, and identifies comparison target items using the retrieved common item codes from the item information database 24. FIG. 6B is a diagram showing a list of the store item code, the common item code, the store code, and the price of the issue target item identified in Step S56 and the store item codes, the common item codes, the store codes, and the prices of the comparison target items identified in the comparison target item identification process (Example 2). In the example of FIG. 6B, the common item codes of the comparison target items, N-510, RW-77, S1100, N-660, K1220Z, S1300, and RW-35, are each related to the common item code "C-123" of the issue target item.

(c) Comparison Target Item Identification Process (Example 3)

In a comparison target item identification process (Example 3), the system controller 4 identifies, as candidate comparison target items, items whose common item code is the same as that of the issue target item and whose store item code is different from that of the issue target item and items whose common item code is related to that of the issue target item and whose store item code is different from that of the issue target item, and stores information such as the store item codes, the common item codes, and the prices of the identified candidate comparison target items in a predetermined area of the RAM. Subsequently, the system controller (the history information retriever 41d) retrieves the history information of the target user identified in Step S52 (the history information associated with the user ID of the target user) from the user information database 23, and identifies items from the search history, the viewing history, or the bookmark history included in the retrieved history information. Among the above identified candidate comparison target items, the system controller 4 identifies items identified from the history information as comparison target items, and stores a log flag of "1" in association with the store item codes of the identified comparison target items. Each log flag indicates whether the corresponding comparison target item was, for example, viewed by the target user. Among the above identified candidate comparison target items, the system controller 4 may identify items whose number of searches or number of views, which is identified from the history information (i.e., the search history or the viewing history), is greater than or equal to a predetermined number of times (threshold value) as comparison target items. Among the above identified candidate comparison target items, the system controller 4 may compare the search time (or the viewing time) for the issue target item with the search time (or the viewing time) for each of the items whose common item code is the same as or related to that of the issue target item, and then identify items whose difference between the times is less than (or less than or equal to) a predetermined difference (threshold value) as comparison target items. FIG. 7A is a diagram showing a list of the store item code, the common item code, the store code, and the price of the issue target item identified in Step S56 and the store item codes, the common item codes, the store codes, the prices, and the log flags of the comparison target items identified in the comparison target item identification process (Example 3). In the example of FIG. 7A, the items assigned store item codes associated with the log flag "1" are comparison target items.

(d) Comparison Target Item Identification Process (Example 4)

In a comparison target item identification process (Example 4), among the above identified candidate comparison target items, the system controller 4 identifies items identified from the history information as comparison target items, as in the comparison target item identification process (c), and stores a log flag in association with the store item codes of the identified comparison target items. Subsequently, the system controller 4 (the estimated viewed item identifying unit 41g) performs an estimated viewed item identification process, which will be described later, to identify estimated viewed items. Among the above identified candidate comparison target items, the system controller 4 identifies estimated viewed items identified by the estimated viewed item identification process as comparison target items, and stores an estimated log flag in association with the store item codes of the identified comparison target items. FIG. 7B is a diagram showing a list of the store item code, the common item code, the store code, and the price of the issue target item identified in Step S56 and the store item codes, the common item codes, the store codes, the prices, the log flags, and the estimated log flags of the comparison target items identified in the comparison target item identification process (Example 4). In the example of FIG. 7B, items not included in the history information are also stored in association with an estimated log flag of "1".

Figure 8:
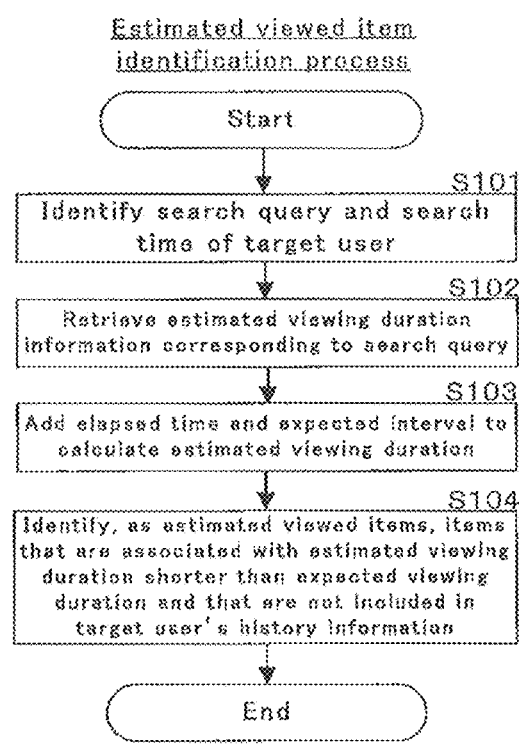
FIG. 8 is a flowchart showing an example of an estimated viewed item identification process.

The estimated viewed item identification process will now be described with reference to FIG. 8. FIG. 8 is a flowchart showing an example of the estimated viewed item identification process. In the estimated viewed item identification process shown in FIG. 8, the system controller 4 identifies, from the search history included in the history information of the target user identified in Step S52, a search query of the target user and the search time associated with the search query (Step S101). Subsequently, the system controller 4 (the estimated viewing information retriever 41f) retrieves the estimated viewing duration information corresponding to the search query identified in Step S101 from the estimated viewing information database 26, as described above (Step S102). Next, the system controller 4 adds the elapsed time between the search time identified in Step S102 and the current time (i.e., the time when this process is performed) to an expected interval between the current time and viewing by the target user, to calculate an expected viewing duration (Step S103). After that, the system controller 4 identifies, as estimated viewed items, items that are associated with an estimated viewing duration that is shorter than the expected viewing duration calculated in Step S103 and that are not included in the target user's history information, among the items included in the estimated viewing duration information retrieved in Step S102 (Step S104). The expected interval before viewing is determined as follows.

For example, the system controller 4 identifies, as the expected interval before viewing by the user U1, the reply interval between sending predetermined item information to the email address of the user U1 and receiving a predetermine reply from the user terminal UT1 of the user U1. This process is performed before the process shown in FIG. 5 is performed. The identified expected interval is stored in association with the user ID of the user U1 in the user information database 23. The above predetermined reply corresponds to, for example, a request that is sent from the user terminal UT1 to the information providing server SA when the user U1 specifies (e.g., with a mouse click or by a finger tap or the like) a uniform resource locator (URL) written in the body of the above email received by the user terminal UT1 of the user U1 Alternatively, the above predetermined reply corresponds to, for example, a request that is sent from the user terminal UT1 to the information providing server SA when the user U1 specifies (e.g., with a mouse click or by a finger tap or the like) a download specification area for downloading content (e.g., an image) set in the above email (e.g., an HTML email) received by the user terminal UT1 of the user U1 There is a case where the predetermined reply can be identified even when the URL or the download specification area in the email is not specified. For example, the system controller 4 may identify, as the expected interval before viewing by the user, the reply interval between sending predetermined item information to the email address of the user U1 and access (an example of the predetermined reply) from a web browser of the user terminal UT1 of the user U1 to a predetermined website (a website provided by the information providing server SA) for the predetermined item information. Such a situation corresponds to, for example, a situation where the user U1's viewing of item information of interest in the email causes the web browser of the user terminal UT1 to start and access the above website.

As another example, the system controller 4 may identify, as the expected interval before viewing by the user U1, the reply interval between sending predetermined information (e.g., a pop-up message) to the toolbar to the web browser of the user terminal UT1 of the logged-in user U1 and access to a predetermined website (a website provided by the information providing server SA) that is made when the information is specified on the web browser. As described above, if an expected interval before viewing by the user U1 is identified based on the reply interval between when the information providing server SA sends information to the user U1 and when a predetermined reply is received from the user terminal UT1 of the user U1, an expected interval based on how each user Un tends to react can be identified. Consequently, an expected viewing duration can be more correctly calculated. The system controller 4 may obtain the above reply interval more than once. In this case, the system controller 4 may identify the average value, the minimum value, or the maximum value of the obtained reply intervals as the above expected interval.

As still another example, the expected interval before viewing may be, for example, the interval between the current time (i.e., the time when this process is performed) and the latest of high access times (hours) that are identified based on a history of usual access to the above website from the web browser of the user terminal UT1 of the user U1. In this case, the system controller 4 identifies some times (e.g., 7:00, 12:30, and 23:00) from hours (e.g., from 7 to 7:30, from 12:30 to 13, and from 23 to 24) during which the user relatively often accesses items, based on the user U1's history information, and identifies the interval between the current time (e.g., 22 p.m.) and the nearest (23) of the identified times as the expected interval before viewing. Also with this configuration, an expected interval based on how each user tends to react can be identified. Consequently, an expected viewing duration can be more correctly calculated.

As described above, when a competing item of an item to be a trigger for issue of an electronic coupon is identified as the issue target item, the item to be the trigger is identified as a comparison target item in Step S57.

Subsequently, the system controller 4 determines whether the comparison target items identified in Step S57 include any comparison target items that are associated with a price lower than the price of the issue target item (Step S58). If it determines that some comparison target items are priced lower than the issue target item (YES in Step S58), the system controller 4 identifies a comparison target item priced lower than the issue target item (step S59). The process then proceeds to Step S60. On the other hand, if it determines that no comparison target item is priced lower than the issue target item (NO in Step S58), the system controller 4 terminates the process shown in FIG. 5. Even if no comparison target item is priced lower than the issue target item, an electronic coupon may be issued. Also in this case, a privilege relative to a price difference may be determined. In Step S60, the system controller 4 calculates the difference in price between the issue target item and the comparison target item identified in Step S59. When there are a plurality of identified comparison target items, the difference in price between the issue target item and each of the comparison target items is calculated.

Next, the system controller 4 (the privilege determiner 41h) determines a coupon amount corresponding to a privilege relative to the difference calculated in Step S60 (Step S61). When there are a plurality of identified comparison target items, the system controller 4 may determine a coupon amount corresponding to a privilege relative to the difference in price between the issue target item and the cheapest of the plurality of comparison target items. This enables determination of an appropriate coupon amount that is competitive with the comparison target item. FIG. 9 is a diagram showing an example coupon amount corresponding to a privilege relative to the difference in price from the cheapest (lowest-priced) of the comparison target items identified in each of the comparison target item identification processes (Example 1) to (Example 4).

When there are a plurality of identified comparison target items, the system controller 4 may determine a privilege (coupon amount) relative to the difference in price between the issue target item and a comparison target item that was selected a predetermined number of times or more (threshold value: five or more times within a predetermined period of time) in past comparisons with the issue target item by the target user, among the plurality of comparison target items. This also enables determination of an appropriate coupon amount that is competitive with the comparison target item. The comparison target item selected in the past comparisons corresponds to, for example, a comparison target item selected by a viewing operation of the target user from a list of the issue target item and comparison target items that is being displayed so as to be available for selection on a web page showing search results previously retrieved based on a search query of the target user. A history of selecting items in such a situation can be identified from the target user's history information. If a comparison target item was selected in a past comparison between the issue target item and the comparison target item, this means that issue target item lost in the comparison. On the other hand, if the issue target item was selected in the past comparison between the issue target item and the comparison target item, this means that issue target item won in the comparison. The comparison target item against which the issue target item wins or loses is a rival item. That is, the comparison target item and the issue target item are in rivalry with each other. In particular, the system controller 4 may identify a comparison target item that has a winning percentage of greater than or equal to 20% and less than 50% against the issue target item as a rival item, and determine a privilege relative to the difference in price between the identified rival item and the issue target item. This means that items that one-sidedly defeat the issue target item are excluded. Rival items may be freely set, for example, by a store SHm that sells the issue target item or the maker Ml that manufactures the issue target item, and be stored in any of the above databases. Rival items may be freely set, for example, by a provider of financial resources for electronic coupons, and be stored in any of the above databases.

When a predetermined condition is met, such as when the comparison target item on which determination of the privilege is based is a rival item, when the target user is a regular customer of the store SHm that sells the issue target item, or when item distribution (item transaction) shows a slowdown trend, the system controller 4 may determine the amount obtained by adding a predetermined amount to the difference calculated in Step S60 to be the coupon amount. The regular customer corresponds to, for example, a user Un whose purchase price at the store SHm that sells the issue target item is greater than or equal to a predetermined amount (threshold value) or whose number of purchases at the store is greater than or equal to a predetermined number of times (threshold value). The slowdown trend in item distribution corresponds to, for example, a case where the total sale of all items (all items stored in the item information database 24) within a predetermined period of time (e.g., a week) shows a downward trend or a case where the total sales volume of all items shows a downward trend.

Subsequently, the system controller 4 sets a validity period for an electronic coupon indicating the coupon amount determined in Step S61 (Step S62). For example, the validity period for the electronic coupon is set to a predetermined period (e.g., a few hours). Alternatively, the system controller 4 may identify a considering duration for the issue target item, based on the history information of each of a plurality of users Un who viewed the above issue target item, and set a validity period (e.g., set the validity period to the considering duration (e.g., thirty minutes)) for the above electronic coupon, based on the identified considering duration (e.g., thirty minutes). The considering duration is the average value, the minimum value, or the maximum value of the viewing durations (the durations of viewing the issue target item) identified from the history information of each of the plurality of user Un. This can give a minimum time required to consider whether to purchase the issue target item to the target user to whom the electronic coupon was provided, and efficiently prompt the user to purchase the item. Alternatively, the system controller 4 may identify changes in the number of accesses from a plurality of user Un registered in the user information database 23 to a predetermined item and identify an estimated period required for the number of accesses to become greater than or equal to a predetermined number (threshold value) from the identified changes. In this case, based on the identified estimated period, the system controller 4 sets a validity period for the electronic coupon indicating the privilege corresponding to the coupon amount determined in Step S61 (e.g., sets the validity period to the estimated period). This can prompt the target user to whom the electronic coupon was provided to purchase the issue target item before the number of accesses to the item exceeds a certain level. The number of accesses to the predetermined item is the number of accesses to all the items stored in the item information database 24, the number of accesses to items in an item category to which the issue target item belongs, or the number of accesses to items whose common item code is the same as or related to that of the issue target item. Such number of accesses is identified, for example, as the total number of searches or the total number of views of the above item included in the history information of each of a predetermined number of users Un.

Subsequently, the system controller 4 (the coupon issuer 41i) issues an electronic coupon indicating the coupon amount determined in Step S61 to the target user identified in Step S52 (Step S63), and then terminates the process shown in FIG. 5. As described above, the issue of the electronic coupon includes assignment of a coupon ID to the electronic coupon indicating the privilege corresponding to the coupon amount determined in Step S61, registration of management information of the electronic coupon, and provision of the electronic coupon to the target user. In the provision of the electronic coupon to the target user, for example, the electronic coupon is sent from the system controller 4 to the web browser of the user terminal UT1 of the target user or to the email address of the target user. The electronic coupon sent to the web browser of the user terminal UT1 is popped up in a window of the web browser or displayed on the toolbar of the web browser, and then becomes available in payment for purchase of the issue target item by the target user.

2-3. Electronic Coupon Issue Process (Push-type)

Figure 10:
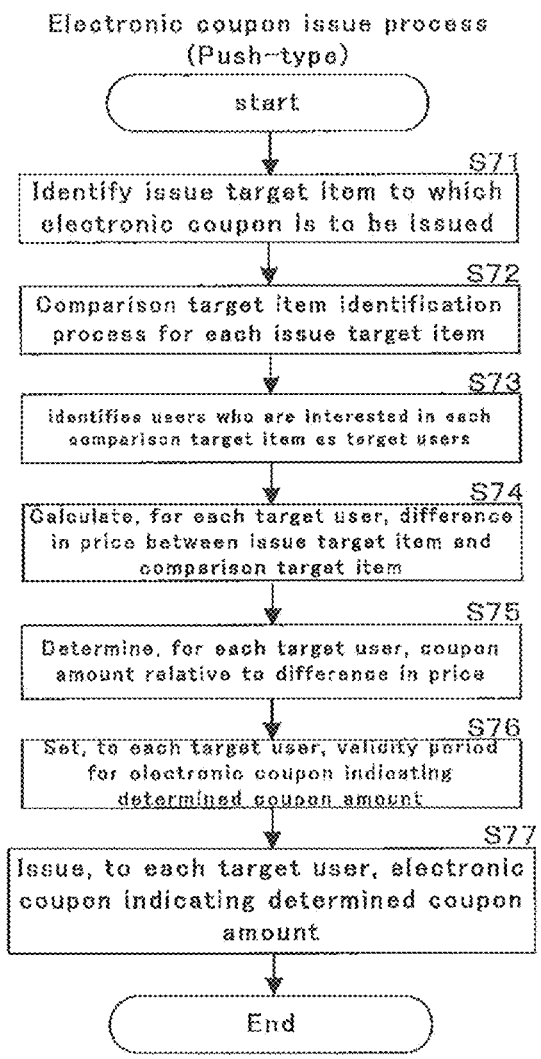
FIG. 10 is a flowchart showing an example of an electronic coupon issue process (Push-type) performed by the system controller 4.

With reference to FIG. 10, the following describes an electronic coupon issue process (Push-type) performed by the system controller 4 of the information providing server SA. FIG. 10 is a flowchart showing an example of the electronic coupon issue process (Push-type) performed by the system controller 4. For example, the system controller 4 determines at predetermined intervals whether a start condition of the electronic coupon issue process is met. If it determines that the start condition of the electronic coupon issue process is met, the system controller 4 starts the process shown in FIG. 10. Examples of the start condition include the following conditions (I) to (VI).

(I) A time set by the timer has come.
(II) The advertising budget for items stored in the item information database 24 (e.g., the total for all or some items) has changed (especially, increased) by a predetermined amount within a predetermined period of time.
(III) The stock quantity of items stored in the item information database 24 (e.g., the total for all or some items) has changed (especially, increased) by a predetermined quantity within a predetermined period of time.
(IV) The number of times that items stored in the item information database 24 were searched for (e.g., the total for all or some items) has increased by a predetermined number within a predetermined period of time.
(V) The number of times that items stored in the item information database 24 were viewed (e.g., the total for all or some items) has increased by a predetermined number within a predetermined period of time.
(VI) The sales of items stored in the item information database 24 during a predetermined period of time (e.g., the total for all or some items) have decreased by a predetermined amount as compared with those during another predetermined period to be compared.
(VII) The rate of increase in the sales of items stored in the item information database 24 during a predetermined period of time (e.g., the total for all or some items) has decreased by a predetermined value as compared with that during another predetermined period to be compared.

When the process shown in FIG. 10 is started, the system controller 4 (the issue target item identifying unit 41b) identifies items that meet the coupon issue criteria as issue target items for which an electronic coupon is to be issued (Step S71), and stores information such as the store item codes, the common item codes, and the prices of the identified issue target items in a predetermined area of the RAM. For example, if the process shown in FIG. 10 is started because the above condition (I) is met, the system controller 4 identifies, as an issue target item that meets the coupon issue criteria, an item associated with a coupon issue flag of "1" (ON), among the items stored in the item information database 24. On the other hand, for example, if the process shown in FIG. 10 is started because the above condition (II) is met, the system controller 4 identifies, as an issue target item that meets the coupon issue criteria, an item corresponding to a store whose advertising budget is greater than or equal to a predetermined amount (threshold value), among the items stored in the item information database 24. On the other hand, for example, if the process shown in FIG. 10 is started because the above condition (III) is met, the system controller 4 identifies, as an issue target item that meets the coupon issue criteria, an item whose stock quantity is greater than or equal to a predetermined number (threshold value), among the items stored in the item information database 24. On the other hand, for example, if the process shown in FIG. 10 is started because the above condition (IV) is met, the system controller 4 identifies, as an issue target item that meets the coupon issue criteria, an item that was searched for more than a predetermined number of times (threshold value) (e.g., an item whose total number of times per unit period that it was searched for is greater than or equal to the predetermined number), among the items stored in the item information database 24. Alternatively, in this case, the system controller 4 may identify, as an issue target item that meets the coupon issue criteria, an item (what is called, a trend item) whose difference between the increase in the number of times per unit period that it was searched for and the past average increase or the increase during the latest period is greater than or equal to a predetermined value (threshold value). On the other hand, for example, if the process shown in FIG. 10 is started because the above condition (V) is met, the system controller 4 identifies, as an issue target item that meets the coupon issue criteria, an item that was viewed more than a predetermined number of times (threshold value) (e.g., an item whose total number of times per unit period that it was viewed is greater than or equal to the predetermined number), among the items stored in the item information database 24. Alternatively, in this case, the system controller 4 may identify, as an issue target item that meets the coupon issue criteria, an item (what is called, a trend item) whose difference between the increase in the number of times per the current unit period that it was searched for and the past average increase or the increase during the latest period is greater than or equal to a predetermined value (threshold value). The current unit period is, e.g., a unit period (e.g., about twenty-four hours) before the current time. The latest period is, e.g., a unit period before the time twenty-four hours ago. On the other hand, for example, if the process shown in FIG. 10 is started because the above condition (VI) is met, the system controller 4 identifies, as an issue target item that meets the coupon issue criteria, an item whose sales are less than (or less than or equal to) a predetermined amount (threshold value), among the items stored in the item information database 24. FIG. 11A is a diagram showing a list of the store item codes, the common item codes, the store codes, and the prices of the issue target items identified in Step S71. In the example of FIG. 11A, three issue target items are identified.

Subsequently, the system controller 4 (the comparison target item identifying unit 41c) performs, for each of the issue target items identified in Step S71, a comparison target item identification process for identifying comparison target items to be compared with the issue target item (Step S72). In Step S72, the same comparison target item identification process (Example 1) or (Example 2) as in the above Step S57 is performed. Comparison target items are thus identified. Next, the system controller 4 (the target user identifying unit 41a) identifies, for each of the comparison target items identified in Step S72, users Un who are interested in the comparison target item as target users to whom an electronic coupon is to be issued (e.g., by their user IDs) (Step S73). For example, the system controller 4 searches the user information database 23 for history information (e.g., viewing history) including the store item code of the comparison target item, and identifies the users Un assigned the users ID associated with the retrieved pieces of history information as users Un who are interested in the comparison target item. Based on the pieces of history information including the store item code of the comparison target item, the system controller 4 may identify users Un who viewed the comparison target item more than a predetermined number of times (threshold value) as users Un who are interested in the comparison target item. Even for users Un whose history information does not include the store item code of the comparison target item, if the store item code of an estimated viewed item identified for each of the users Un through the estimated viewed item identification process shown in FIG. 8 is the same as that of the above comparison target item, the system controller 4 may identify the users Un as users Un who are interested in the comparison target item. FIG. 11B is a diagram showing the store item codes, the common item codes, the store codes, and the prices of the comparison target items identified in Step S72, and the user IDs of the target users identified for each comparison target item in Step S73. In the example of FIG. 11B, the target users corresponding to the comparison target items are indicated by "1".

Next, the system controller 4 calculates, for each of the target users identified in Step S73, the difference between the price of the corresponding issue target item identified in Step S71 and the price (the lowest price, when there are a plurality of comparison target items) of the comparison target item identified as an item to be compared with the issue target item in Step S72 (Step S74). After that, the system controller 4 determines, for each target user, a coupon amount relative to the difference calculated in Step S74 (Step S75). Subsequently, the system controller 4 sets, for each target user, a validity period for an electronic coupon indicating the coupon amount determined in Step 75 (Step S76). Subsequently, the system controller 4 (the coupon issuer 41i) issues, for each target user, an electronic coupon indicating the corresponding coupon amount determined in Step S75 (Step S77), and then terminates the process shown in FIG. 10.

As described above, according to the above embodiment, the system controller 4 identifies a search query of a target user to whom an electronic coupon is to be issued and the corresponding search time, and adds the elapsed time between the search time and the current time to an expected interval between the current time and viewing by the target user, to calculate an expected viewing duration. The system controller 4 then identifies, as estimated viewed items, items associated with an estimated viewing duration of less than or equal to or of less than the calculated expected viewing duration, among items included in estimated viewing duration information corresponding to the identified search query. Based on items included in the target user's history information and on the identified estimated viewed items, the system controller 4 generates an electronic coupon to be provided to the target user. Thus, even if there is a time lag between when an electronic coupon to be provided is generated based on the target user's history information and when the target user views the provided electronic coupon, information useful to the target user can be provided and unnecessary traffic can be reduced.

Although an electronic coupon is taken as an example of information provided to a target user in the above embodiment, the present invention can also be applied to, for example, recommendation information. For example, the system controller 4 identifies an item category that the target user has an interest in or a concern for, based on items included in the target user's viewing history and on estimated viewed items not included in target user's viewing history but identified by the estimated viewed item identifying unit 41g. The system controller 4 then generates recommendation information for items that belong to the identified item category and provides the generated recommendation information to a web browser of an user terminal UTn of the target user or to his or her email address. In this case, the system controller 4 identifies an item that is not identical to (e.g., does not have the same common item code as) any of the items included in the viewing history and any of the estimated viewed items, among the items that belong to the identified item category, generates recommendation information about the identified item, and provides the recommendation information to the target user. This enables provision of recommendation information about a fresh item to the target user, thus making the recommendation information more appealing. This can also be applied to, for example, news such as today's occurrences. That is, based on news articles (examples of the information element) included in the target user's viewing history and on estimated viewed news articles not included in the viewing history but identified by the estimated viewed item identifying unit 41g (news articles that the target user would have viewed), the system controller 4 identifies a news article that is not identical to (e.g., does not have the same news headline as) any of the news articles, generate news information that delivers the identified news article (e.g., an email body or an article on a web page), and provides the news information to the target user. This enables provision of fresh news information to the target user.

REFERENCE SIGNS LIST 1 communication unit
2 storage unit
3 input/output interface unit
4 system controller
MTl maker terminal
STm store terminal
UTn user terminal
SA information providing server

The invention claimed is:

1. An apparatus for providing information, the apparatus comprising:
   at least one memory configured to store computer program code; and
   at least one processor configured to read the computer program code and carry out instructions in the computer program code, the computer program code comprising:
      target user identifying code configured to cause at least one of the at least one processor to identify a user to whom information is to be provided;
      search query identifying code configured to cause at least one of the at least one processor to identify a search query entered by the identified user and a search time when a search is performed based on the identified search query, from history information of the identified user;
      expected viewing duration calculation code configured to cause at least one of the at least one processor to calculate an expected viewing duration based on
         an elapsed time between the identified search time and a current time, and
         an expected interval between the current time and an expected time of viewing, wherein
            the expected interval being based on user interactions from the history information of the identified user, and
            the expected time of viewing indicates when the identified user starts viewing information elements returned by the identified search query;
      information element identifying code configured to cause at least one of the at least one processor to identify, within estimated viewing information, information elements each having an estimated viewing duration, being a duration determined based on past elapsed times between the identified search time and a corresponding viewing time of each information element by each of a plurality of users including the identified user, is less than or equal to the calculated expected viewing duration, the estimated viewing information indicating an estimated viewing duration for each of the identified information elements based on history information of each of the plurality of users and corresponding to the identified search query; and
      generating code configured to cause at least one of the at least one processor to generate information to be provided to the identified user, based on information elements included in the history information of the identified user and based on the identified information elements.

2. The apparatus according to claim 1, wherein the computer program code further comprises:
   time identifying code configured to cause at least one of the at least one processor to identify, for a respective user of the plurality of users, a respective search time for each of the information elements and a respective viewing time at or after the respective search time, from history information of the respective user; and
   first estimated viewing duration calculation code configured to cause at least one of the at least one processor to calculate an estimated viewing duration for each of the information elements for all of the plurality of users, based on the respective search time and the respective viewing time.

3. The apparatus according to claim 2, wherein the first estimated viewing duration calculation code is configured to cause at least one of the at least one processor to:
   calculate, for each of the information elements and each of the plurality of users, an elapsed time between the identified search time and the corresponding viewing time, and
   calculate the estimated viewing duration based on the calculated elapsed times, and
   wherein the computer program code further comprises setting code configured to cause at least one of the at least one processor to determine an average viewing duration for the information elements, based on the history information of each of the plurality of users, and set the determined average viewing duration as an upper limit for elapsed times to be calculated.

4. The apparatus according to claim 1, wherein the computer program code further comprises:
   classifying code configured to cause at least one of the at least one processor to classify the plurality of users into a plurality of segments, based on predetermined classification criteria; and
   second estimated viewing duration calculation code configured to cause at least one of the at least one processor to calculate, for each of the plurality of segments, an estimated viewing duration for each of the information elements, based on history information of each of the plurality of users belonging to the segment.

5. The apparatus according to claim 1, wherein the computer program code further comprises expected interval identifying code configured to cause at least one of the at least one processor to identify, as the expected interval before the viewing, an interval between sending information to the identified user and receiving a predetermined reply from a terminal of the identified user.

6. The apparatus according to claim 1, wherein the computer program code further comprises expected interval identifying code configured to cause at least one of the at least one processor to identify a respective time from hours during which the identified user has a higher number of accesses to the information elements, based on the history information of the identified user, and identify, as the expected interval before the viewing, an interval between the current time and the identified respective time.

7. A method for providing information performed by a computer, the method comprising:
   identifying a user to whom information is to be provided;

identifying a search query entered by the identified user and a search time when a search is performed based on the identified search query, from history information of the identified user;

calculating an expected viewing duration, the expected viewing duration being a duration based on
- an elapsed time between the identified search time and a current time, and
- an expected interval between the current time and an expected time of viewing, wherein
  - the expected interval being based on user interactions from the history information of the identified user, and
  - the expected time of viewing indicates when the identified user starts viewing information elements returned by the identified search query;

identifying, within estimated viewing information, information elements each having an estimated viewing duration, being a duration determined based on past elapsed times between the identified search time and a corresponding viewing time of each information element by each of a plurality of users including the identified user, is less than or equal to the calculated expected viewing duration, the estimated viewing information indicating an estimated viewing duration for each of the identified information elements based on history information of each of the plurality of users and corresponding to the identified search query; and generating information to be provided to the identified user, based on information elements included in the history information of the identified user and based on the identified information elements.

8. A non-transitory computer readable recording medium which records program for causing a computer to identify a user to whom information is to be provided;

identify a search query entered by the identified user and a search time when a search is performed based on the identified search query, from history information of the identified user;

calculate an expected viewing duration, the expected viewing duration being a duration based on
- an elapsed time between me identified search time and a current time, and
- an expected interval between the current time and an expected time of viewing, wherein
- the expected interval being based on user interactions from the history information of the identified user, and
- the expected time of viewing indicates when the identified user starts viewing information elements returned by the identified search query;

identify, within estimated viewing information, information elements each having an estimated viewing duration, being a duration determined based on past elapsed times between the identified search time and a corresponding viewing time of each information element by each of a plurality of users including the identified user, is less than or equal to the calculated expected viewing duration, the estimated viewing information indicating an estimated viewing duration for each of the identified information elements based on history information of each of the plurality of users and corresponding to the identified search query; and generate information to be provided to the identified user, based on information elements included in the history information of the identified user and based on the identified information elements.

* * * * *